United States Patent
Iida

(10) Patent No.: US 7,092,010 B2
(45) Date of Patent: Aug. 15, 2006

(54) IMAGE PHOTOGRAPHING SYSTEM

(75) Inventor: Takayuki Iida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 676 days.

(21) Appl. No.: 10/201,925

(22) Filed: Jul. 25, 2002

(65) Prior Publication Data
US 2003/0020813 A1    Jan. 30, 2003

(30) Foreign Application Priority Data
Jul. 30, 2001    (JP)    ............... 2001-229621

(51) Int. Cl.
H04N 5/225    (2006.01)
H04N 5/76    (2006.01)
H04N 5/222    (2006.01)

(52) U.S. Cl. ............... 348/207.1; 348/231.3; 348/333.02

(58) Field of Classification Search ........... 348/333.02, 348/207.1, 237.3
See application file for complete search history.

(56) References Cited

U.S. PATENT DOCUMENTS

| 6,396,537 | B1 * | 5/2002 | Squilla et al. | 348/239 |
| 6,433,818 | B1 * | 8/2002 | Steinberg et al. | 348/161 |
| 6,535,243 | B1 * | 3/2003 | Tullis | 348/207.1 |
| 6,618,553 | B1 * | 9/2003 | Shiohara | 386/117 |
| 6,644,455 | B1 * | 11/2003 | Ichikawa | 194/205 |
| 6,832,102 | B1 * | 12/2004 | I'Anson | 455/556.1 |
| 6,833,861 | B1 * | 12/2004 | Matsumoto et al. | 348/207.2 |

* cited by examiner

Primary Examiner—Ngoc-Yen Vu
Assistant Examiner—Adam L Henderson
(74) Attorney, Agent, or Firm—Sughrue Mion, PLLC

(57) ABSTRACT

The present invention provides an image photographing system, which permits a user to easily photograph images and place, orders for printing. A digital still camera is rented to the user with a prepaid card affixed thereto, the prepaid card serving to write the number of times into the digital still camera, and an image saving area dedicated to the user is opened on an image server connected to the Internet. After the user photographs images with the digital still camera, image data for images, which the user selects, is saved in the image data saving area via a portable apparatus, and the saved images can also be browsed therewith. When the user places an order for printing one of the saved images, the corresponding image data is sent to a print finishing dealer, and a photographic print is created.

17 Claims, 13 Drawing Sheets

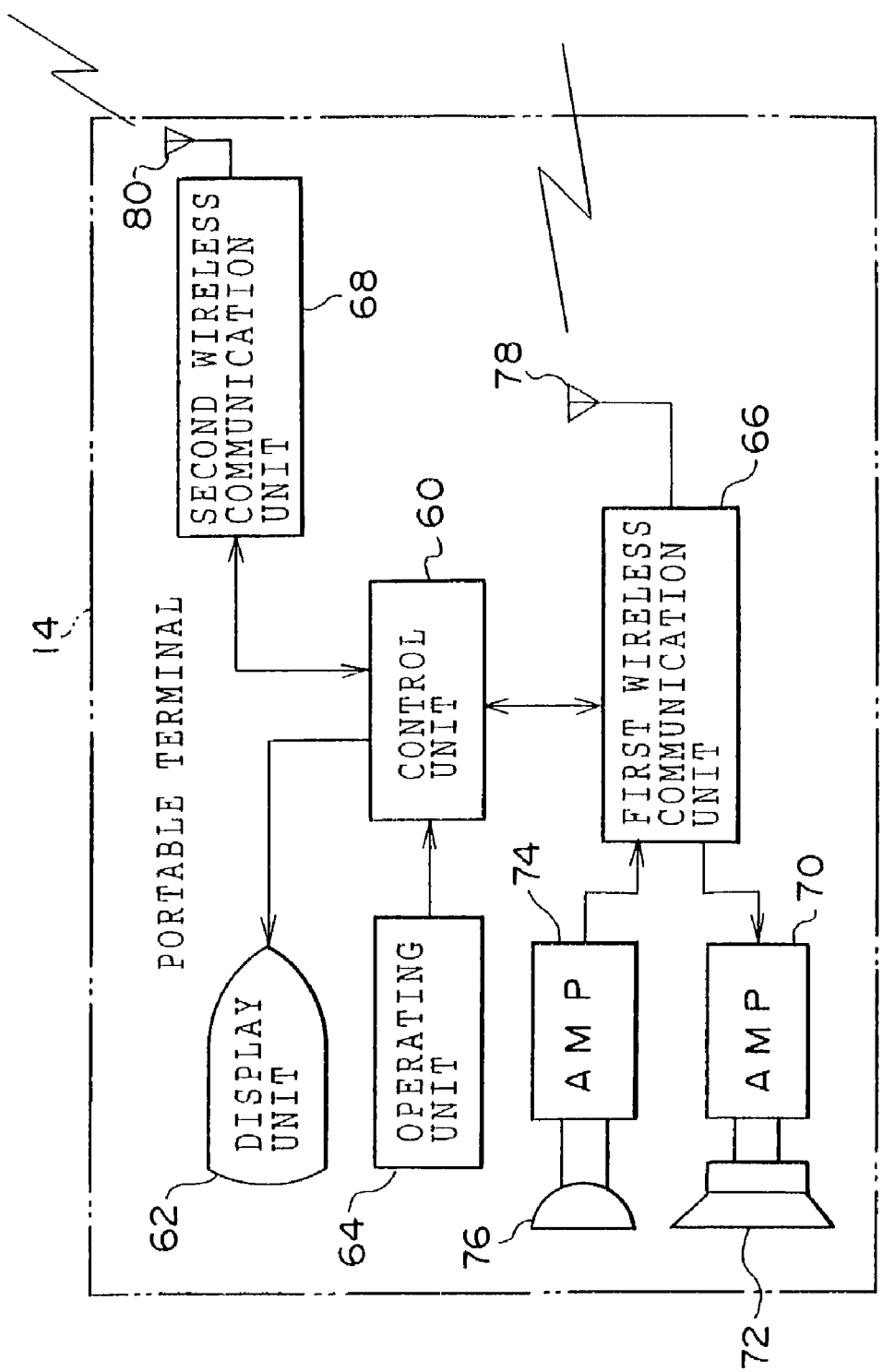

FIG. 3

PREPAID CARD FOR A DIGITAL CAMERA

SCRATCH THE COATING BELOW WITH A COIN OR OTHER HARD OBJECT, AND INPUT THE CODE THAT IS REVEALED INTO THE DIGITAL CAMERA USING YOUR PORTABLE TELEPHONE.

<INPUT METHOD>

TO INPUT THE CODE, PRESS THE MENU BUTTON ON THE DIGITAL CAMERA TO DISPLAY A MENU SCREEN ON YOUR PORTABLE TELEPHONE. SELECT "UPDATE THE REMAINING NUMBER OF TIMES", AND ENTER THE CODE USING THE KEYS OF YOUR PORTABLE TELEPHONE WHILE THE CODE INPUT SCREEN IS DISPLAYED.

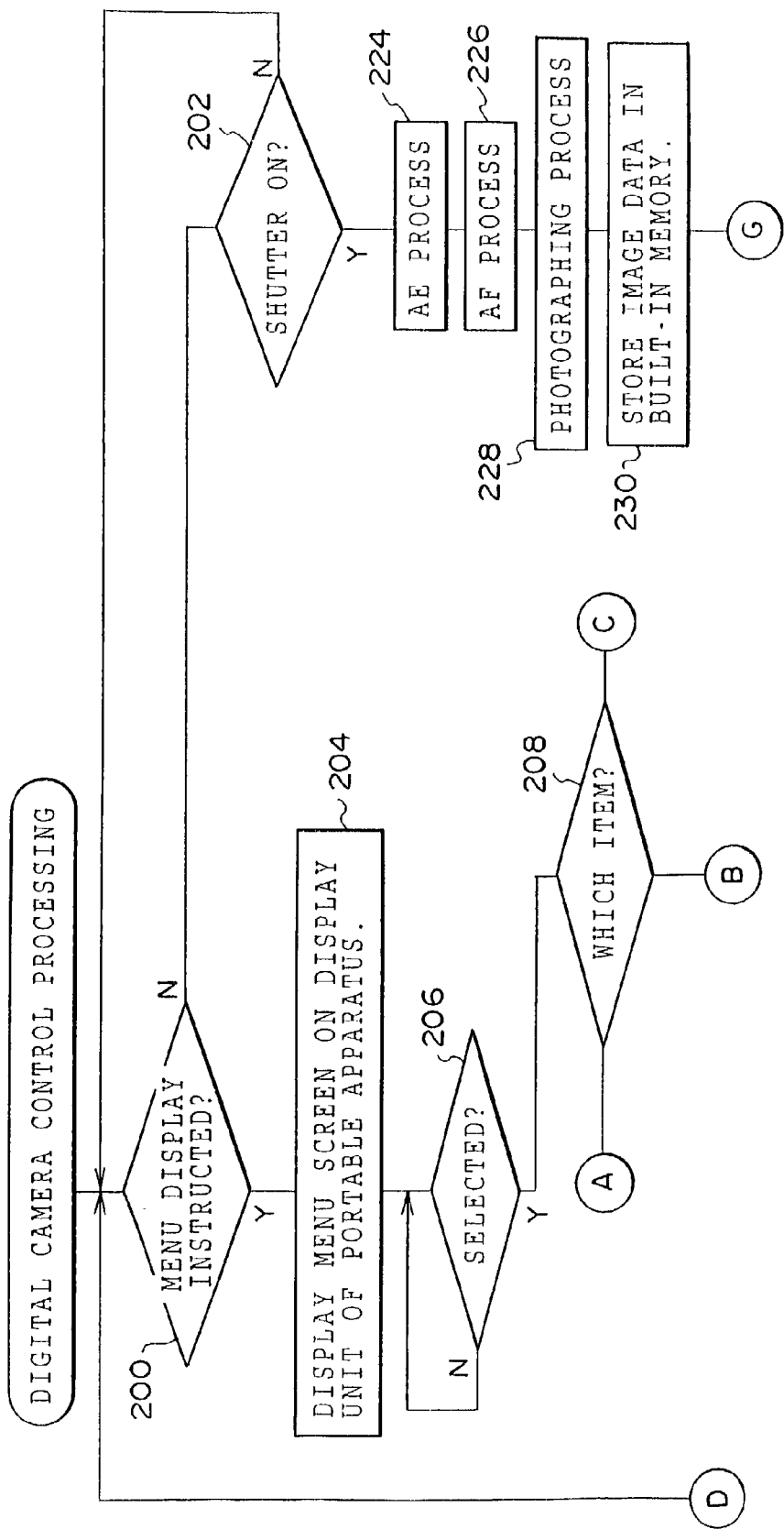

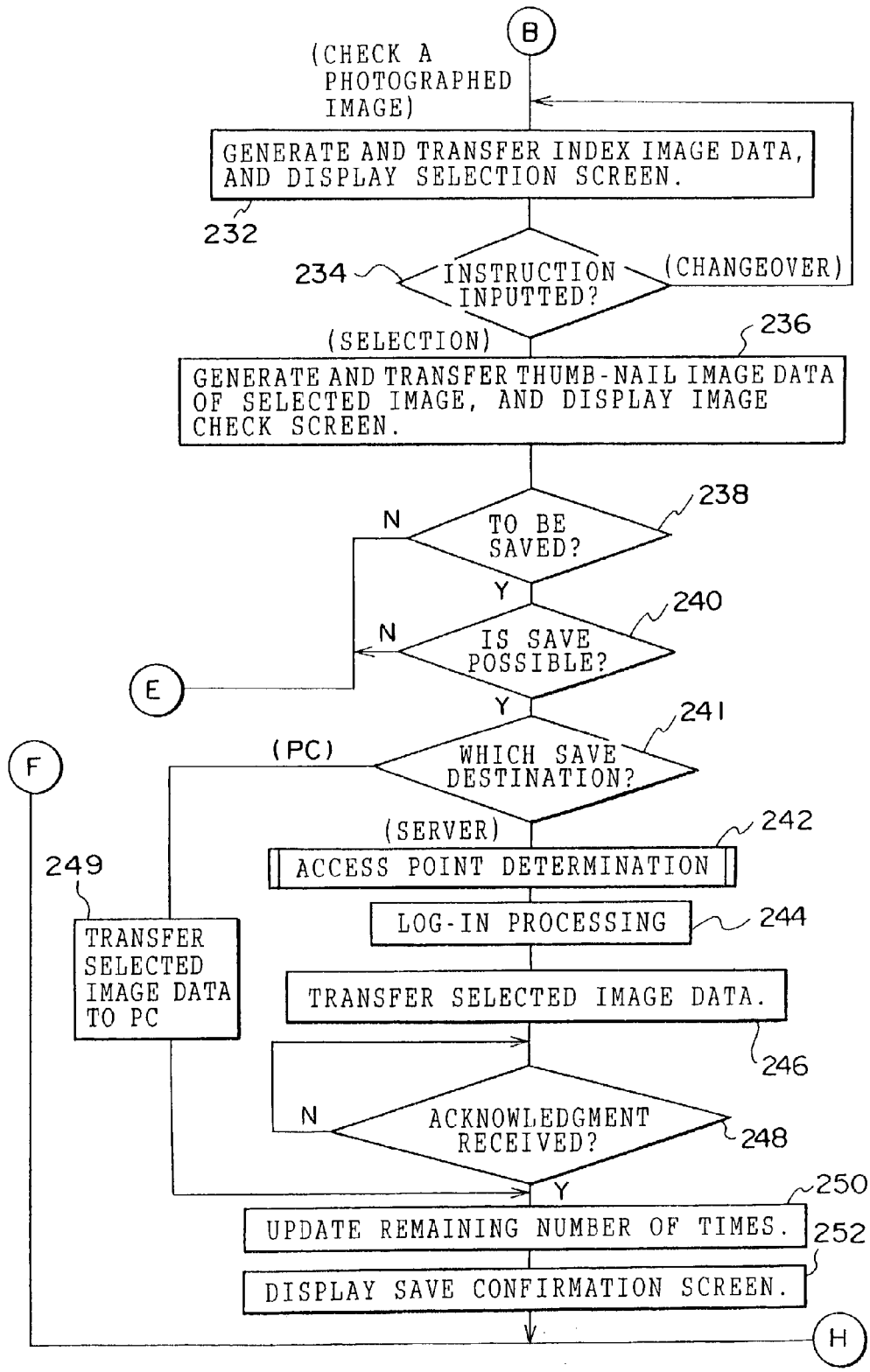

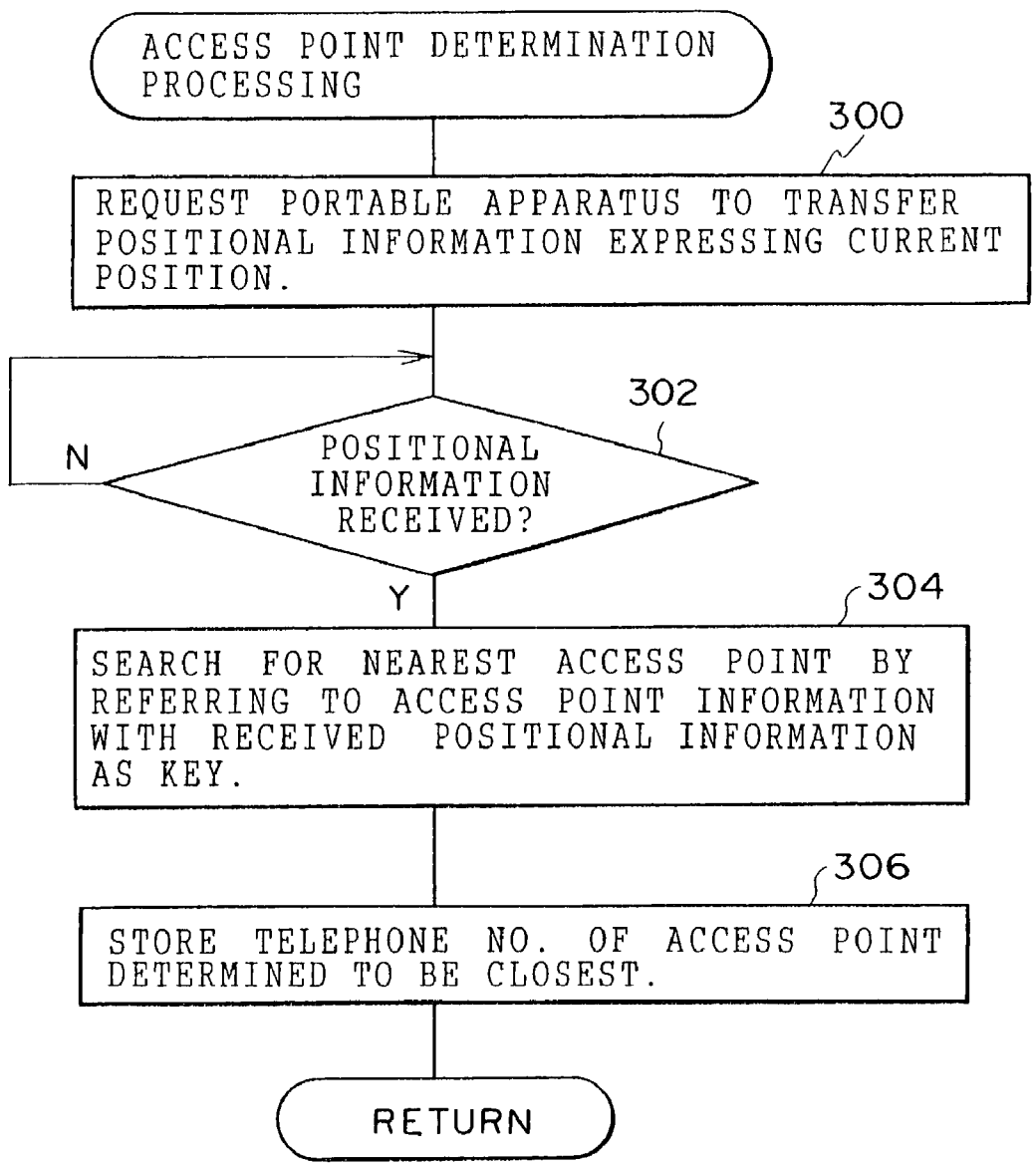

FIG. 6A

MENU

1. UPDATE THE NUMBER OF TIMES
2. CHECK A PHOTOGRAPHED IMAGE
3. BROWSE MY SCENE FOLDER

PLEASE SELECT A DESIRED ITEM. ─

FIG. 6B

SINCE THE CURRENT REMAINING NUMBER OF TIMES IS ZERO, THE CAMERA CANNOT BE USED.

PLEASE ENTER THE CODE PRINTED ON YOUR PURCHASED PREPAID CARD.

THE CURRENT REMAINING NUMBER OF TIMES IS xx TIMES.

PLEASE ENTER THE CODE PRINTED ON YOUR PURCHASED PREPAID CARD.

**_

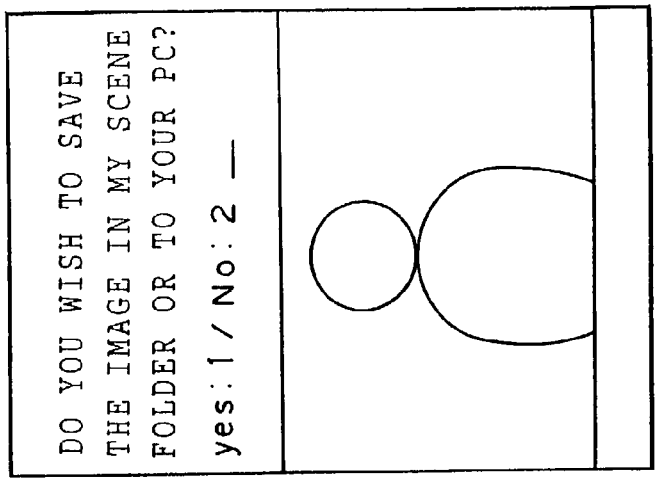
FIG. 6D  FIG. 6E  FIG. 6F
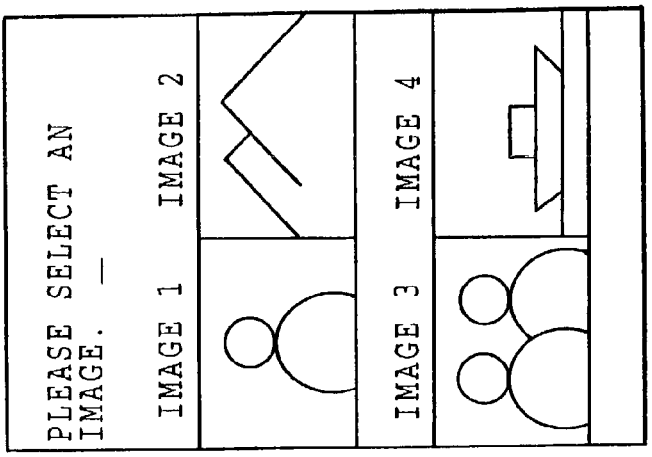

IMAGE PHOTOGRAPHING SYSTEM

BACKGROUND OF THE INVENTION

1. Field of the Invention

The present invention relates to an image photographing system, and more particularly to an image photographing and ordering method for allowing a user to photograph images and to order prints, and an image photographing device which can be used with the image photographing and ordering method.

2. Description of the Related Art

Digital still cameras, which have rapidly spread in recent years, are structured so that each includes an imaging device such as CCD, an optical image is photographed by the imaging device, and that an analog image signal obtained by the photographing is converted into digital image data, which is thereafter stored in an information storage medium such as Smart Media card. A user can obtain a photographic print of high image quality by sending a photo lab the image data obtained by the photographing and requesting that it create the photographic print. Also, the user can easily record the image expressed by the image data, easily on paper or the like by using a printer, which he/she possesses.

One way in which the digital still camera is especially superior to a conventional camera, wherein a silver halide photographic film is exposed to an image so as to record the image, is that the photographed image can be reproduced and displayed on a display unit then and there, thereby to check whether or not the photographing was successful. It is an unavoidable fact, however, that an expensive LCD must be adopted as the display component for displaying the image, when reduction in the size of the digital still camera is considered. It has accordingly been difficult to provide a digital still camera, which is as inexpensive as a lensed film unit employing the silver halide photographic film.

Incidentally, there are some digital still cameras, which have attained sharp curtailment in cost by omission of the LCD. Since such a digital still camera cannot immediately reproduce and display a photographed image, however, the advantage of the digital still camera is lost and thus such digital still cameras do not meet the needs of most users.

Also, when the digital still camera uses a 64 MB Smart Media card as a recording medium, for example, as many as 198 images can be saved in the recording medium (in a case where each of the images consists of 1280×960 pixels and has a data amount of 312 kB). Since the recording medium is expensive as compared with the silver halide photographic film, however, an initial cost for photographing images with the digital still camera is high.

Further, in the case where the user sends the image data obtained by the photographing to the photo lab and requests that it creates the photographic prints, a separate recording medium is required in order to photograph further images with the digital still camera while the photographic prints are being created at the photo lab. Also, the user requires a personal computer (PC) or a printer in order to record the photographed images on paper or the like.

As stated above, the digital still camera itself is expensive as are the recording media and peripheral equipment, which are required in order to use the digital still camera. These factors have been obstacles to the popularization of digital still cameras, and it has been difficult for digital still cameras to meet the demands of users, such as a desire to be able to readily obtain a digital still camera and request printing of favorites from among the photographed images, as in the case of lensed film units.

SUMMARY OF THE INVENTION

The present invention has been achieved in consideration of the above-described circumstances, and a first object of these is to provide an image photographing system which includes an image photographing device that is highly functional and inexpensively available to a user.

Further, a second object the present invention is to provide an image photographing and ordering method, which permits a user to easily photograph images and order prints thereof.

As means for inexpensively offering an image photographing device, such as digital still camera or digital video camera, to a user, the inventor of the present invention has devised a system in which an image photographing device capable of photographing a predetermined number of images is lent in exchange for a rental fee paid by the user. In the system, the image photographing device to be lent ought to be made less costly in itself so as to lower the fee, which the user pays for renting the image photographing device. Further, a mechanism needs to be provided for easily preventing the user from photographing images in excess of the predetermined number without payment of an additional rental fee and allowing the user to photograph images in excess of the predetermined number subject to payment of the additional rental fee.

Considering the above items, in order to accomplish the first object, an image photographing device in a first aspect is constructed comprising a photographing component which converts an optical image into image data; a built-in storage component in which the image data is temporarily stored; a communication component which can communicate with a communication apparatus having a function of communicating with an image server connected to a computer network; a save control component which saves the image data temporarily stored in the storage component by photographing by the photographing component, in a predetermined image saving area managed by the image server, by means of the communication apparatus, in such a way that the image data is transferred to the communication apparatus through the communication component when the image data is instructed to be saved; and a management component which stores the number of times written in a predetermined procedure, which updates the stored number of times each time the save control component saves the image data, and which forbids at least one of the photographing by the photographing component and the save of the image data by the save control component when the number of times has become a predetermined value.

In the first aspect, the communication component is disposed which can communicate with the communication apparatus having the function of communicating with the image server connected to the computer network (for example, the Internet or any other network). Incidentally, it is favorable to utilize, for example, an equipment which can be carried by the user and which is possessed by the user, as the communication apparatus (thus, the user need not prepare the communication apparatus anew). Concretely, a portable telephone, PDA (Personal Digital Assistant), wearable computer, or mobile computer can be applied as the communication apparatus. Besides, although the communication between the communication apparatus and the communication component may well be wire communication, it should preferably be wireless communication such as the Bluetooth when the labor of connecting a communication cable, etc. are considered.

Besides, in the first aspect, in the case where the instruction of saving the image data temporarily stored in the storage component by the photographing by the photographing component has been given (by way of example, the aspect may be so constructed that the instruction is given by operating a switch or the like disposed in the image photographing device according to the present invention, or it may well be so constructed that the instruction is given by operating a switch or the like disposed in the communication apparatus, whereupon it is inputted to the image photographing device), the save control component transfers the image data to the communication apparatus through the communication component, whereby the image data is saved by the communication apparatus in the predetermined image saving area which is managed by the image server connected to the computer network.

In this manner, in the first aspect, the image data instructed to be saved is saved in the predetermined image saving area managed by the image server. Therefore, even in a case where the instruction of saving a large amount of image data may possibly be given, the built-in storage component need not be set at a large capacity, and it is also dispensed with to construct the image photographing device so as to be capable of loading a recording medium and to furnish the image photographing device with a mechanism for saving the image data in the loaded recording medium, so that the image photographing device can be constructed inexpensively. Moreover, the user need not prepare the expensive recording medium, so that an economical burden to the user can be further lightened.

Further, the image photographing device in the first aspect includes the management component which stores the number of times written in the predetermined procedure, which updates the stored number of times each time the save control component saves the image data, and which forbids at least one of the photographing by the photographing component and the save of the image data by the save control component when the number of times has become the predetermined value. Incidentally, the number of times may be updated in accordance with the mere number of the image data, which are saved, or it may well be updated considering also the data amount of the image data, which are saved.

In this way, it is preventable to use the image photographing device according to the present invention, in excess of the quantity of use corresponding to the written number of times (by way of example, it is preventable to save image data in a number larger than the number of images to-be-saved corresponding to the written number of times), and it is easily preventable to illegally rewrite the number of times, by keeping confidential the procedure itself for writing the number of times, information required in writing the number of times, or the like. It is therefore preventable to photograph an image or to save the data of the photographed image after the number of times has become the predetermined value. Besides, it can be easily implemented that, in case of the fulfillment of a certain requirement such as the payment of an additional expense by the user, the image photographing device is brought into a usable state again by writing the number of times again.

Accordingly, the image photographing device in the first aspect is very suitable for an aspect where the device is lent as an equivalent for a rent paid by the user. According to the first aspect, it is possible to obtain an image photographing device which is of high function (capable of saving a large amount of image data) and which can be inexpensively offered to the user.

Meanwhile, the image data transferred from the image photographing device according to the present invention to the communication apparatus is saved in the predetermined image saving area in such a way that a communication line is secured between the communication apparatus and a predetermined access point for connection to the computer network, that the image server is accessed by the connection to the computer network via the predetermined access point, and that the image data is transferred to the image server after a procedure such as authentication has been taken as may be needed. Here, in a case where the communication apparatus is a portable one (the equipment which can be carried by the user) and where the communication cost between the access point and the communication apparatus differs in accordance with the distance of the communication apparatus to the access point, etc., the communication apparatus should preferably be connected to the computer network via the access point nearest to its current position among access points which are ordinarily located in a plurality of places, in order to suppress the communication cost.

Therefore, the communication apparatus is the equipment which can be carried by the user, the image photographing device includes a positional information storage component in which a plurality of positions of the access points for permitting the communication apparatus to communicate with the image server are stored, and the save control component acquires information expressive of the current position from the communication apparatus, it judges the nearest access point on the basis of the acquired information and the information stored in the positional information storage component, and it controls the communication apparatus so that the image data may be saved in the predetermined image saving area via the judged nearest access point.

The plurality of positions of the access points are stored beforehand, the nearest access point is judged from the current position acquired from the communication apparatus, and the image data is transferred (the image data is saved in the predetermined image saving area) via the judged access point, so that the communication cost between the communication apparatus and the access point in the case of saving the image data in the predetermined image saving area can be suppressed to the required minimum.

Besides, in a case where the user possesses an information processor such as PC, there arise the needs that the user wants to utilize the image data obtained by the photographing with the image photographing device according to the present invention, by the possessed information processor. Considering the needs, the save control component should preferably have such a function that, when the instruction of saving the image data has been given, the image data instructed to be saved is transferred to the information processor possessed by the user, thereby to save the image data in a storage medium built in or connected to the information processor. Thus, the needs of the user as stated above can be met. Incidentally, it is needless to say that the number of times is updated by the management component even in the case where the image data instructed to be saved is transferred to the information processor so as to be saved in the storage medium.

Besides, in order to accomplish the first object, an image photographing device in a second aspect is constructed comprising a photographing component which converts an optical image into image data; a built-in storage component in which the image data is temporarily stored; a save control component which saves the image data temporarily stored in the storage component by photographing by the photographing component, in a storage medium built in or connected to a predetermined external equipment, by reading out the image data and transferring it to the predetermined external equipment when the image data is instructed to be saved; and a management component which stores the number of times written in a predetermined procedure, which updates the stored number of times each time the save control component saves the image data, and which forbids at least one of the photographing by the photographing component and the save of the image data by the save control component when the number of times has become a predetermined value.

In the second aspect, in the case where the instruction of saving the image data temporarily stored in the storage component by the photographing by the photographing component has been given, the save control component transfers the image data to the predetermined external equipment, thereby to save the image data in the storage medium which is built in or connected to the predetermined external equipment. Thus, as in the first aspect, even in a case where the instruction of saving a large amount of image data may possibly be given, the built-in storage component need not be set at a large capacity, and it is also dispensed with to furnish the image photographing device with a mechanism for saving the image data in a recording medium loaded into the image photographing device, so that the image photographing device can be constructed inexpensively. Moreover, the user need not prepare the expensive recording medium, so that an economical burden to the user can be further lightened.

Further, as in the first aspect, the image photographing device in the second aspect includes the management component which stores the number of times written in the predetermined procedure, which updates the stored number of times each time the save control component saves the image data, and which forbids at least one of the photographing by the photographing component and the save of the image data by the save control component when the number of times has become the predetermined value. Therefore, it is preventable to use the image photographing device according to the present invention, in excess of the quantity of use corresponding to the written number of times, and it is easily preventable to illegally rewrite the number of times, by keeping confidential the procedure itself for writing the number of times, information required in writing the number of times, or the like. It is therefore preventable to photograph an image or to save the data of the photographed image after the number of times has become the predetermined value. Besides, it can be easily implemented that, in case of the fulfillment of a certain requirement such as the payment of an additional expense by the user, the image photographing device is brought into a usable state again by writing the number of times again.

Accordingly, also the image photographing device in the second aspect is very suitable for the aspect where the device is lent as an equivalent for a rent paid by the user. According to the second aspect, it is possible to obtain an image photographing device which is of high function and which can be inexpensively offered to the user.

Besides, in the first aspect or the second aspect, certain limits may well be set to the term of use of the image photographing device lent to the user. This can be incarnated by constructing the management component so that at least one of the photographing by the photographing component and the save of the image data by the save control component is forbidden also in a case, for example, where a predetermined term has lapsed since the writing of the number of times.

Besides, in the first aspect or the second aspect, it is favorable to further dispose a communication component which is permitted to perform wireless communication with a portable type image display apparatus that is furnished with a display unit capable of displaying an image and that has the function of performing wireless communication, and a transfer component which transfers the image data to the image display apparatus through the communication component over the wireless communication so that the image expressed by the image data obtained by the photographing by the photographing component may be displayed on the display unit of the image display apparatus.

In this way, the image photographed by the photographing component is reproduced and displayed on the display unit of the portable type image display apparatus, and the user can immediately check the photographed image by referring to the reproduced and displayed image. Therefore, the image photographing device need not be furnished with an expensive display unit formed of an LCD or the like, and it can be constructed more inexpensively.

Besides, it is favorable that the transfer component generates thumbnail image data at a resolution lowered from that of the image data obtained by the photographing by the photographing component, and that it transfers the generated thumbnail image data to the image display apparatus. Thus, the thumbnail image of the photographed image is displayed on the display unit of the image display apparatus. However, the thumbnail image of low resolution suffices for the check of the photographed image in most cases, and a time period, which is expended, in transferring the image data to the image display apparatus can be shortened by transferring the data of the thumbnail image.

Besides, it is favorable to utilize, for example, an equipment, which is possessed by the user, as the portable type image display apparatus (thus, the user need not prepare the portable type image display apparatus anew). Concretely, a portable telephone, a PDA, a wearable computer, a mobile computer or the like can be applied as the portable type image display apparatus. Besides, a known wireless communication technique such as the Bluetooth or infrared communication can be utilized for the wireless communication with the image display apparatus.

Besides, in order to accomplish the second object, an image photographing and ordering method in a third aspect comprises the steps of lending an image photographing device to a user as an equivalent for a rent paid by the user, after the number of times has been written into the image photographing device in the first aspect in a predetermined procedure, or by attaching information required for the user himself/herself to write the number of times into the image photographing device in the predetermined procedure, and also opening an image saving area dedicated to the user, and managed by the image server connected to the computer network; allowing the user to browse through the communication apparatus, images expressed by image data which the user has saved in the image saving area dedicated to the user; and creating a photographic print by employing the image data saved in the image saving area, in a case where an order for printing has been given through the communication apparatus by the user, as to a specified one of the images expressed by the image data saved in the image saving area, and delivering the created photographic print to the user.

In the third aspect, as the equivalent for the rent paid by the user, the image photographing device in the first aspect is lent to the user after the number of times has been written thereinto in the predetermined procedure, or by attaching the information required for the user himself/herself to write the number of times thereinto in the predetermined procedure, while the image saving area dedicated to the user is opened by the image server connected to the computer network. Therefore, the user can photograph the images for a predetermined term by employing the hired image photographing device, and he/she can save the image data in a predetermined amount corresponding to the number of times written into the image photographing device, in the image saving area dedicated to the user.

Besides, in the third aspect, the user is allowed to browse through the communication apparatus the images expressed by the image data, which the user has saved in the image saving area dedicated to the user, so that the user can utilize the image saving area as My Scene Folder. Further, in the third aspect, in the case where the user has given the order for printing, through the communication apparatus as to the specified one of the images expressed by the image data saved in the image saving area, the photographic print is created using the image data saved in the image saving area, and the created photographic print is delivered to the user, so that the user can give the order for printing and receive the created photographic print without performing an act such as carrying to an accepting shop a recording medium in which the image data have been recorded.

In this way, even the user who does not possess an equipment such as PC or printer is permitted to photograph the images by using the image photographing device, to save the image data obtained by the photographing, to browse the images expressed by the saved image data, and to give the order for printing the favorite images. Besides, since the image photographing device according to the present invention, per se, can be constructed at a low cost as stated before, also the rent, which the user pays for hiring the image photographing device, can be suppressed low, and it is avoidable to force a heavy economical burden upon the user. Accordingly, the third aspect can meet the needs that, when a person wants to photograph images, he/she will readily procure the digital still camera and give an order for printing favorite ones of the photographed images, and the user can easily photograph the images and give the order for printing.

Besides, in the third aspect, at least the number of times to be written into the image photographing device should preferably be altered in accordance with the rent paid by the user. Thus, each individual user can hire the image photographing device at an expense corresponding to his/her needs. Besides, at least one of the term (predetermined term) for which the user can use the image photographing device, the term of opening of the image saving area dedicated to the user, and the size of the image saving area may well be altered in accordance with the rent paid by the user. In this case, it is also possible to cope with the needs of the user who might vary the available term, the opening term and the area size.

Besides, in the third aspect, it should preferably be performed subject to the payment of the additional expense by the user that the number of times stored in the image photographing device is rewritten in the predetermined procedure, or that the information required for the user himself/herself to rewrite the number of times into the image photographing device in the predetermined procedure is given to the user. Thus, in a case where the user desires to continuously use the hired image photographing device, he/she is permitted to continuously use the image photographing device.

An image photographing system in a fourth aspect provides an image photographing system comprising an image server which is connected to a computer network; image saving areas which are managed by the image server; a communication apparatus which has a function of communicating with the image server; and an image photographing device; the image photographing device comprising a photographing component which converts an optical image into image data; a built-in storage component in which the image data is temporarily stored; a first communication component which can communicate with the communication apparatus; a save control component which saves the image data temporarily stored in the storage component by photographing by the photographing component, in the image saving area by the communication apparatus, in such a way that the image data is transferred to the communication apparatus through the first communication component when the image data is instructed to be saved; and a management component which stores the number of times written in a predetermined procedure, which updates the stored number of times each time the save control component saves the image data, and which forbids at least one of the photographing by the photographing component and the save of the image data by the save control component when the number of times has become a predetermined value; wherein the image photographing system is characterized in that, as an equivalent for a rent paid by a user, the image photographing device is lent to the user after the number of times has been written thereinto in the predetermined procedure, or by attaching information required for the user himself/herself to write the number of times into the image photographing device in the predetermined procedure, while the image saving area dedicated to the user is opened; that the user is allowed to browse through the communication apparatus the images expressed by the image data which the user has saved in the image saving area dedicated to the user; and that, in a case where an order for printing has been given through the communication apparatus by the user, as to a specified one of the images expressed by the image data saved in the image saving area, a photographic print is created by employing the image data saved in the image saving area, whereupon the created photographic print is delivered to the user.

As described above, the first aspect includes the communication component which can communicate with the communication apparatus having the function of communicating with the image server connected to the computer network, it transfers the image data instructed to-be-saved to the communication apparatus through the communication component in compliance with the instruction of saving the image data, thereby to save the image data in the predetermined image saving area managed by the image server, it updates the number of times written in the predetermined procedure, each time the image data is saved, and it forbids at least one of the photographing and the save of the image data when the number of times has become the predetermined value. Therefore, it has the excellent advantage that the image photographing device which is of high function and which is inexpensively offerable to the user is provided.

The communication apparatus is set to be any of the portable telephone, PDA, wearable computer and mobile computer which can be carried by the user and which the user possesses. Therefore, the first aspect has in addition to the above advantage, the advantage that the user need not prepare the communication apparatus anew.

The plurality of positions of the access points via which the communication apparatus communicates with the image server are stored beforehand, the nearest access point is judged on the basis of the stored information and the information expressing the current position and acquired from the communication apparatus, and the save of the image data in the image saving area is controlled so as to proceed via the nearest access point. Therefore, the first aspect has in addition to the above advantages, the advantage that the communication cost between the communication apparatus and the access point in the case of saving the image data in the predetermined save area can be suppressed to the required minimum.

The first aspect is endowed with the function that, when the instruction of saving the image data has been given, the image data instructed to be saved is transferred to the information processor possessed by the user and then saved in the storage medium built in or connected to the information processor. Therefore, it has in addition to the above advantages, the advantage of satisfying the needs that the image data obtained by the photographing are desired to be utilized by the information processor possessed by the user.

The second aspect reads out the image data temporarily stored in the storage component and transfers the image data to the predetermined external equipment in compliance with the instruction of saving the image data, thereby to save the image data in the storage medium built in or connected to the predetermined external equipment, it updates the number of times written in the predetermined procedure, each time the image data is saved, and it forbids at least one of the photographing and the save of the image data when the number of times has become the predetermined value. Therefore, it has the excellent advantage that the image photographing device which is of high function and which is inexpensively offerable to the user is provided.

The communication component is so constructed that it can perform the wireless communication with the portable type image display apparatus which is furnished with the display unit capable of displaying the image and which has the function of performing the wireless communication, and the image data obtained by the photographing is transferred to the image display apparatus over the wireless communication so that the image expressed by the image data may be displayed on the display unit of the image display apparatus. Therefore, the second aspect has in addition to the above advantage, the image photographing device can be constructed more inexpensively.

The thumbnail image data at the resolution lower than that of the image data obtained by the photographing is generated, and it is transferred to the image display apparatus. Therefore, the second aspect has in addition to the above advantages, the advantage that the time period expended in transferring the image data to the image display apparatus can be shortened.

The portable type image display apparatus is set to be any of the portable telephone, PDA, wearable computer and mobile computer which the user possesses. Therefore, the second aspect has in addition to the above advantages, the advantage that the user need not prepare the portable type image display apparatus anew.

The third aspect lends the image photographing device in the first or second aspect to the user after the number of times has been written thereinto or by attaching the information required for the user himself/herself to write the number of times thereinto, as the equivalent for the rent paid by the user, it opens the image saving area dedicated to the user, it allows the user to browse the images expressed by the image data saved in the image saving area, and it creates the photographic print by using the saved image data so as to deliver the created photographic print to the user, in the case where the user has given the order for printing the specified image. Therefore, it has the excellent advantage that the user can easily photograph the images and give the order for printing.

At least, the number of times to be written into the image photographing device is altered in accordance with the rent paid by the user. Therefore, the third aspect has in addition to the above advantage, the advantage that each individual user can hire the image photographing device at the rent corresponding to his/her needs.

In the case where the user has paid the additional expense, the number of times stored in the image photographing device is rewritten, or the information required for the user himself/herself to rewrite the number of times is given to the user. Therefore, the third aspect has in addition to the above advantages, the advantage that the user is permitted to continuously use the hired image photographing device as desired by him/her.

BRIEF DESCRIPTION OF THE DRAWINGS

FIGS. 1A to 1C are block diagrams showing the schematic construction of an image photographing and ordering system according to an embodiment of the present invention;

FIG. 3 is an image diagram showing an example of a prepaid card for use with the digital still camera according to the embodiment;

FIGS. 4A to 4D are flow charts showing the contents of digital camera control processing which is executed by a control unit included in the digital still camera;

FIG. 5 is a flow chart showing the contents of access point determination processing; and FIGS. 6A to 6I are image diagrams showing examples of various screens which are displayed on the display unit of a portable apparatus.

DESCRIPTION OF THE PREFERRED EMBODIMENTS

Figure 1A:
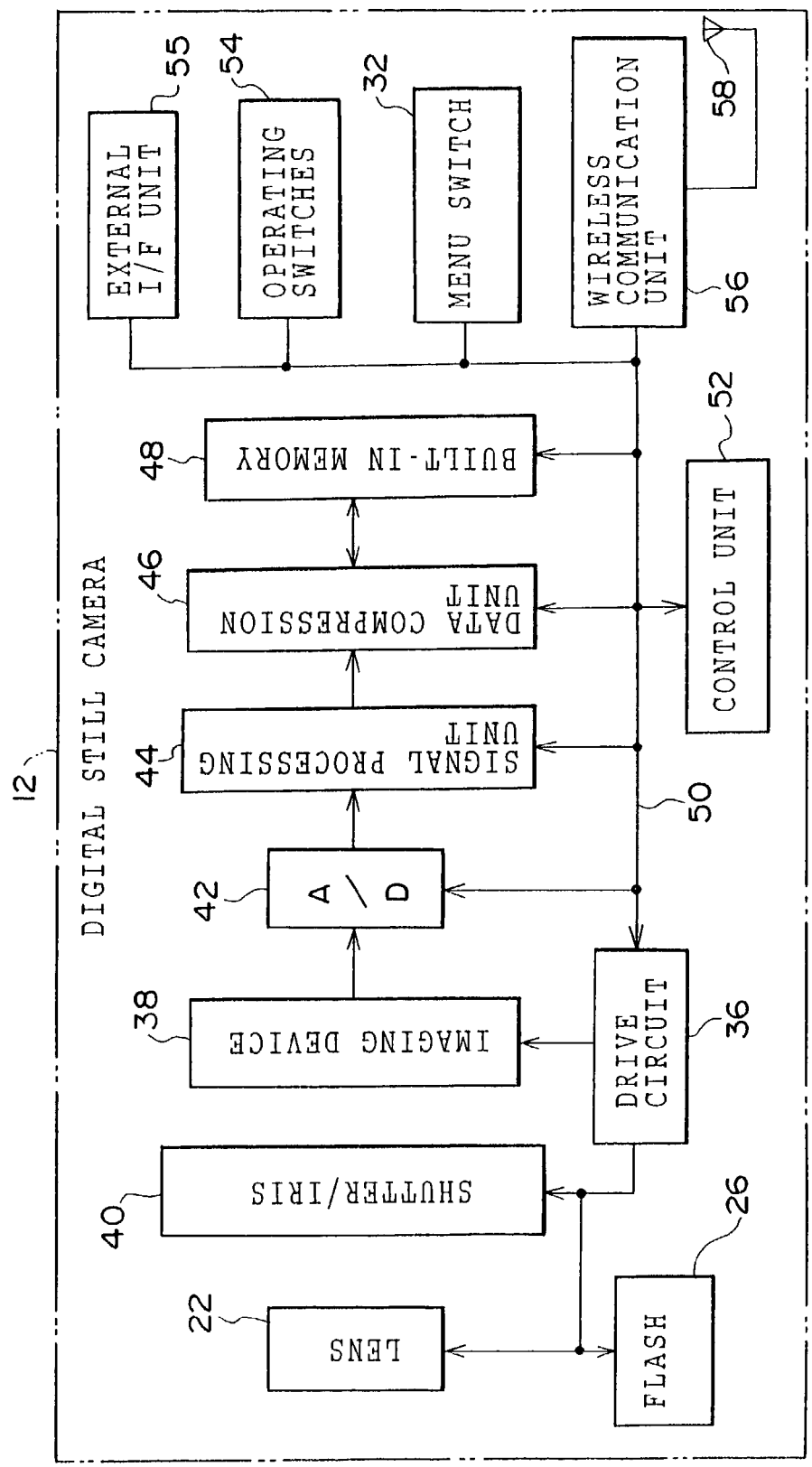
Figure 1C:
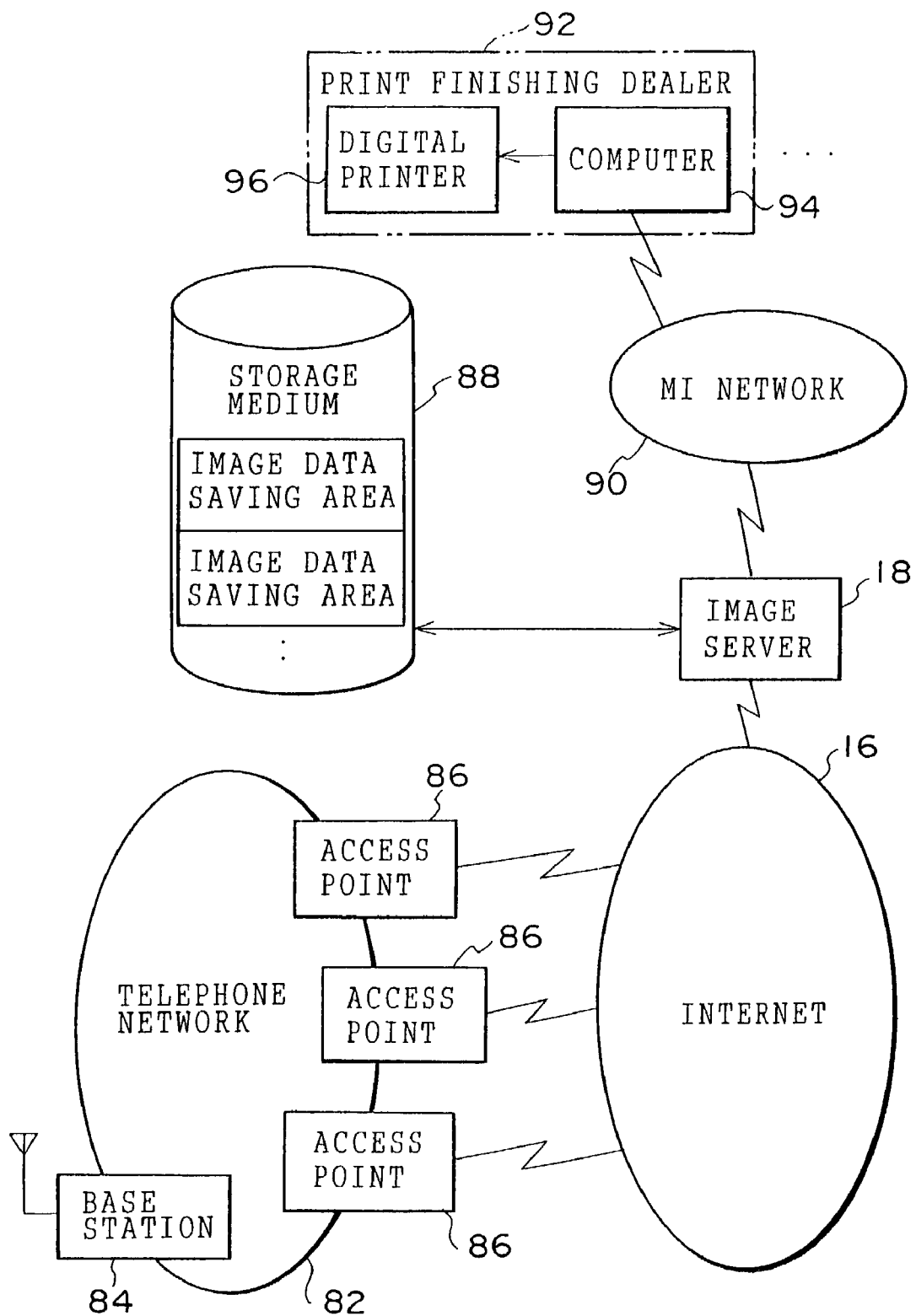

An embodiment of the present invention will now be described in detail with reference to the drawings. FIGS. 1A to 1C show an image photographing and ordering system according to this embodiment. The image photographing and ordering system is constructed including a digital still camera 12 which is lent to a user, a portable terminal 14 which comprises a portable telephone (e.g. PHS (Personal Handyphone System being used in Japan)) possessed by a user, and an image server 18 which is connected to the Internet 16. Incidentally, the digital still camera 12 corresponds to the image photographing device of the present invention, while the portable terminal 14 corresponds to a communication apparatus in a first aspect of the invention and an image display apparatus in a second aspect of the invention.

Figure 2A:
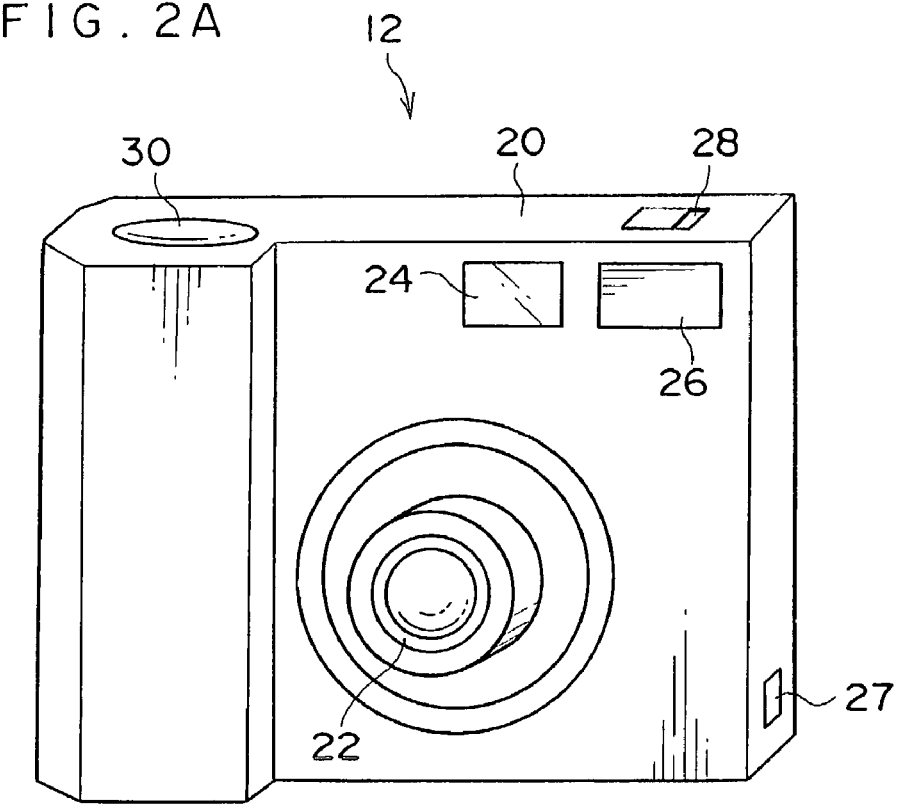
FIGS. 2A and 2B are perspective views showing the external appearances of a digital still camera.
Figure 2B:
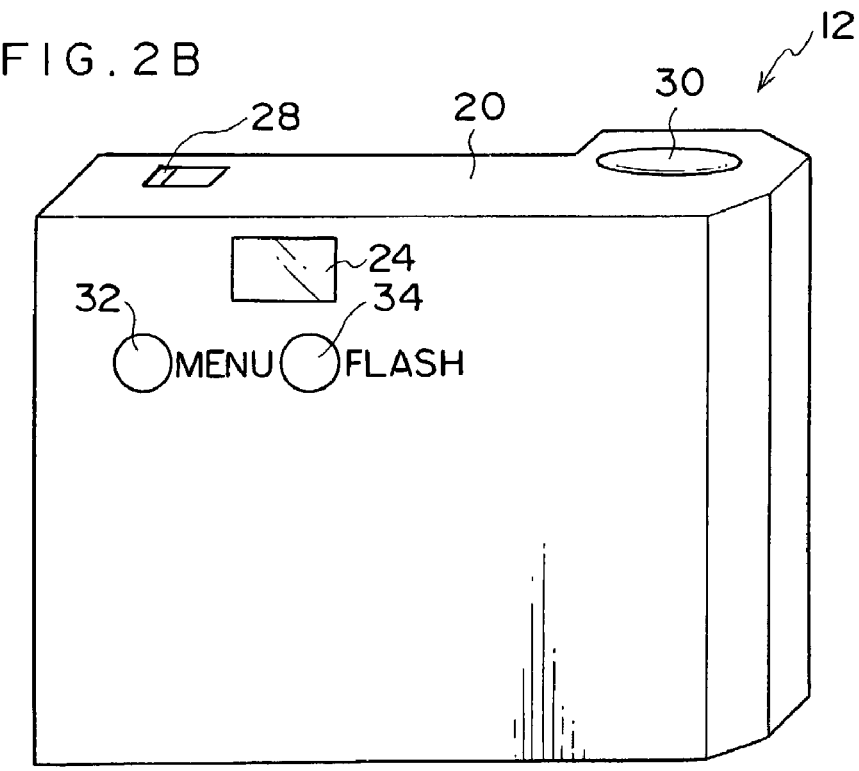
Figure 4B:
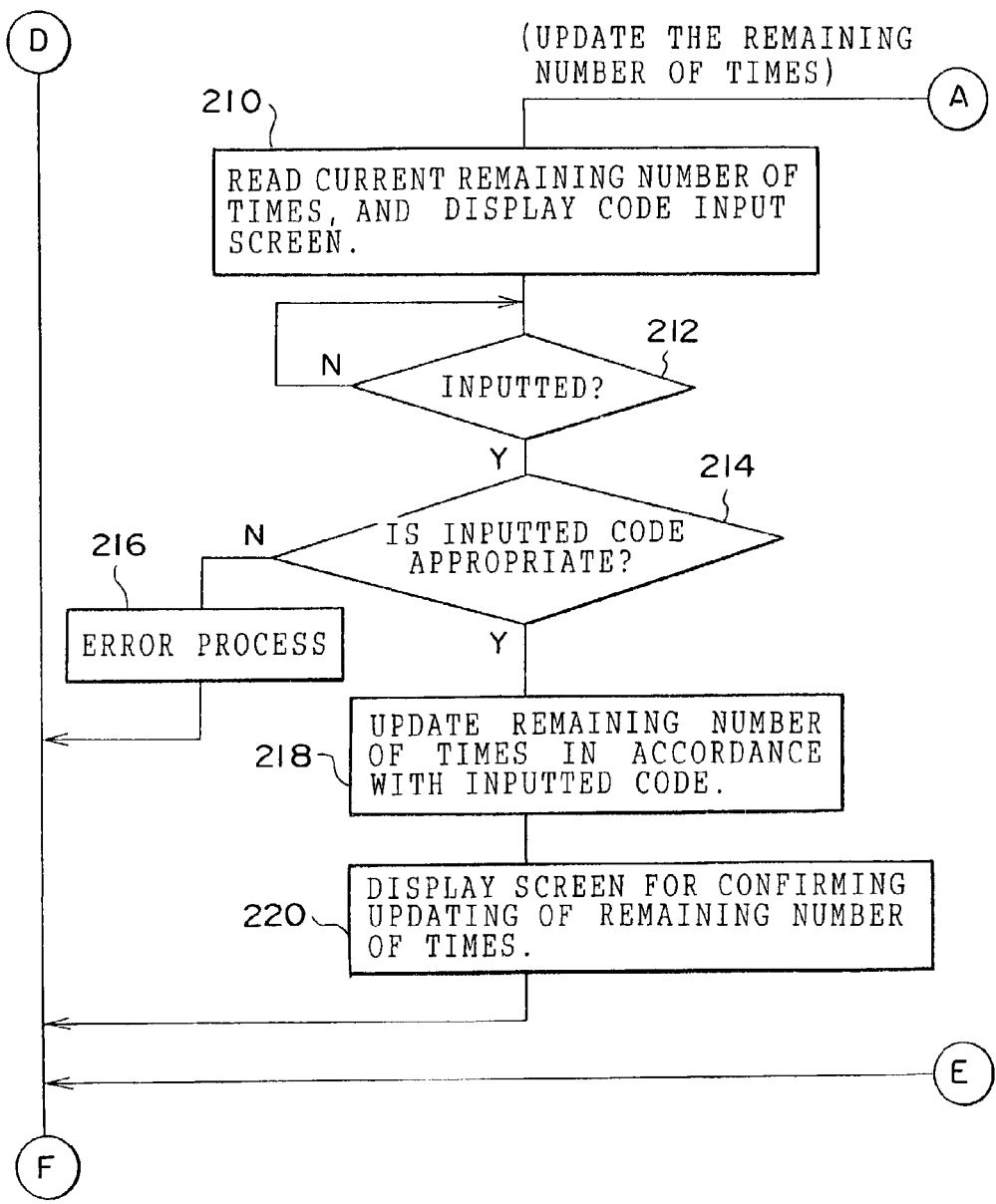
Figure 4D:
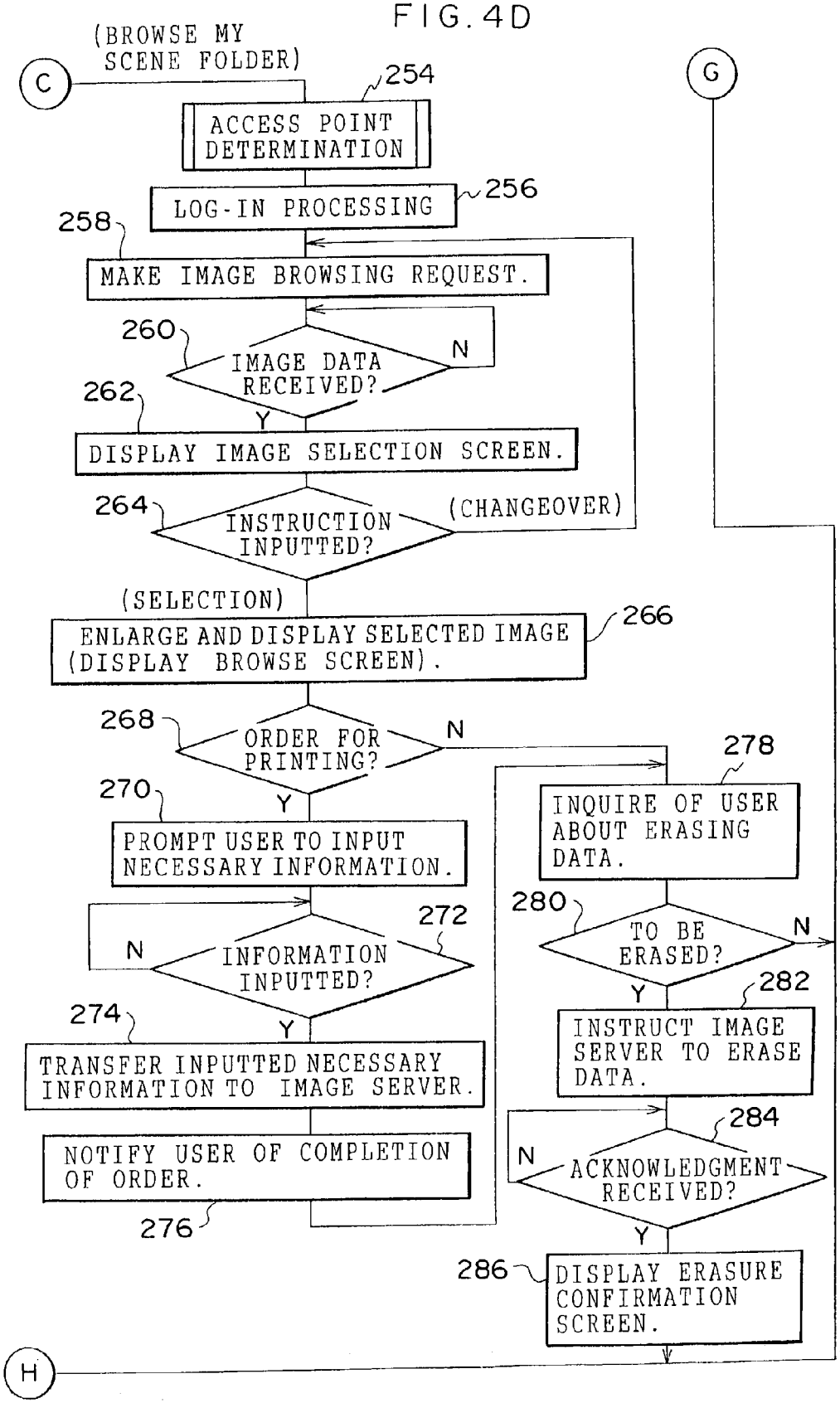

The digital still camera 12 corresponding to the image photographing device of the present invention will now be described. As shown in FIGS. 2A and 2B, a body 20 of the digital still camera 12 is substantially box-shaped and is formed with a protrusion (grip) for facilitating grasping of the body 20, disposed at a front left side thereof. As shown in FIG. 2A, a lens 22 is mounted at a central part of a front surface of the body 20. Mounted at parts of the front surface of the body 20 above the lens 22 are an optical finder 24 with which the user visually checks a photographing range etc., and a flash 26 which emits auxiliary light when photographing under low illumination, or the like. Further, a terminal 27 for transmitting/receiving information between the digital still camera 12 and an information processor such as personal computer (PC) is disposed at a right side surface of the body 20 as viewed from a front side thereof.

On a top surface of the body 20, a power source switch 28 and a shutter button 30 are respectively disposed at the right and at the left (at a position corresponding to the grip) as viewed from the front side. As shown in FIG. 2B, a menu switch 32 and a flash switch 34 are respectively mounted at parts of a rear surface of the body 20 below the optical finder 24. Incidentally, as seen in FIGS. 2A and 2B, the digital still camera 12 is not provided with a display unit for reproducing and displaying photographed images, or a slot for loading a recording medium for recording image data for the photographed images, whereby curtailment in the cost of the digital still camera 12 is attained.

A structure of an electric system of the digital still camera 12 is shown in FIG. 1A. The lens 22 is specifically a zoom lens (variable focal distance lens) including an auto focus (AF) mechanism, and the AF mechanism and zoom mechanism of the lens 22 are driven by a drive circuit 36. Incidentally, a fixed focal distance lens including only the AF mechanism may be employed as the lens 22, instead of the zoom lens.

An imaging device 38 comprising an area CCD sensor or the like is disposed at a position inside the body 20 which corresponds to a focal point of the lens 22, and light reflected from a subject and entering the lens 22 is focused on a photosensitive face of the imaging device 38. The imaging device 38 is driven at a timing synchronized with a timing signal, which is generated by a built-in timing generation circuit (not shown) of the drive circuit 36, and outputs an image signal (a signal expressing quantities of light received on a large number of individual photoelectric cells which are arrayed in a matrix shape on the photosensitive face).

A shutter/iris 40 is disposed between the lens 22 and the imaging device 38, and the shutter and the iris are driven by the drive circuit 36. The shutter serves to prevent smearing from being generated due to the incidence of light on the photosensitive face of the imaging device 38 when the image signal is outputted therefrom, and it can be dispensed with in some constructions of imaging devices. Furthermore, the iris may be constructed of a single iris which can continuously alter an f-stop number, or it may well be constructed so as to change-over a plurality of irises having different f/stop numbers. The drive circuit 36 is also connected to the flash 26. The flash 26 is activated by the drive circuit 36 when the low illuminance has been detected or when the user has given instruction for activation.

An A/D converter 42, a signal processing unit 44, a data compression unit 46 and a built-in memory 48 are connected in this order to a signal output end of the imaging device 38. The image signal outputted from the imaging device 38 is converted by the A/D converter 42 into digital image data, which is inputted to the signal processing unit 44 and subjected to various processing, such as color correction, γ corrections and Y/C transformation. The image data outputted from the signal processing unit 44 is compressed and translated into an image file of predetermined format (e.g., JPEG format) by the data compression unit 46, and the image file is temporarily stored in the built-in memory 48.

Incidentally, the built-in memory 48 corresponds to a storage component in each of the first and second aspects, and the lens 22, the imaging device 38, the A/D converter 42 and the signal processing unit 44 correspond to a photographing component in each of the first and second aspects. The built-in memory 48 is always supplied with electric power by a battery, which is loaded into the digital still camera 12. Thus, the built-in memory 48 functions as a nonvolatile memory whose stored contents are rewritable.

The drive circuit 36, the A/D converter 42, the signal processing unit 44, the data compression unit 46 and the built-in memory 48 are connected to a bus 50. A control unit 52, which includes a CPU, a ROM (which stores therein a program for executing digital camera control processing to be explained later), and a RAM, is connected to the bus 50, and a menu switch 32 is connected thereto. Further, switches (expressed as "operating switches 54" in FIG. 1A), which include the power source switch 28, the flash switch 34, and a shutter switch adapted to be turned on or off by operating the shutter button 30, are connected to the bus 50. Incidentally, the control unit 52 also functions as a save control component and a management component in each of the first and second aspects.

An external I/F unit 55, for transmitting/receiving information to/from the PC via the terminal 27, and a wireless communication unit 56 are also connected to the bus 50. An antenna 58 is connected to the wireless communication unit 56 for performing wireless communication via the antenna 58 with the portable terminal 14 possessed by the user. Incidentally, a communication method of the wireless communication should preferably be one of a microwave type having a communicable distance of, at most, several meters or so, which permits communication even while the user is moving (for example, the Bluetooth or HomeRF). It is also possible, however, to employ a close coupling type whose communicable distance is, at most, about 2 mm, a proximity type whose communicable distance is, at most, about 10 cm, or a proximity type whose communicable distance is, at most, about 70 cm. Further, the wireless communication can be replaced with a contact-type communication method in which the digital still camera 12 performs communication while electrically connected with the portable terminal 14. The wireless communication unit 56 corresponds to a communication component in each of the first and second aspects.

Incidentally, the digital still camera 12 according to this embodiment can, for example, conform to specifications indicated in the following table 1.

TABLE 1

<Example Specifications of Digital Still Camera 12>

| ITEM | CONTENTS |
| --- | --- |
| Number of images which can be photographed | Unlimited |
| Number of thumbnail images which can be displayed | Unlimited |
| Number of images which can be stored | 50 (corresponding to two rolls of 24-frame silver halide photographic film) |
| Capacity of built-in memory | 16 MB (320 kB/frame × 50 frames) (1280 × 960 pixels per frame, normal compression) |
| Number of times which images can be read out (retrieved) | 50 |
| Readout destination of images | (1) User's PC: chiefly used by user (2) My Scene Folder: shared with friends or acquaintances |

Next, the portable terminal 14 possessed by the user will be described. As shown in FIG. 1B, the portable terminal 14 is provided with a control unit 60 which comprises a CPU, a ROM and a RAM. Connected to the control unit 60 are a display unit 62 which comprises an LCD or the like and which can display various types of information including images, an operating unit 64 comprising a ten-keys, touch pad or the like, a first wireless communication unit 66, and a second wireless communication unit 68. A speaker 72 is connected to the first wireless communication unit 66 through an amplifier 70, while a microphone 76 is connected to the first wireless communication unit 66 through an amplifier 74. An antenna 78 is further connected to the first wireless communication unit 66.

The first wireless communication unit 66 performs wireless communication via the antenna 78 under the control of the control unit 60 with a base station 84, which is connected to a cable-wired telephone network 82, by employing electromagnetic waves of a predetermined frequency bandwidth allocated for portable telephones. Further, an antenna 80 is connected to the second wireless communication unit 68, which performs wireless communication via the antenna 80 with the digital still camera 12 possessed by the user (with the wireless communication unit 56 of the camera 12).

The telephone network 82 is connected to the Internet 16 through a large number of access points 86. The image server 18 connected to the Internet 16 is a Web server comprises a workstation or the like, and a large-capacity storage medium 88 comprising a hard disk or the like is connected to the image server 18. The storage medium 88 includes a large number of image data saving areas for separately saving image data for individual users, with the image data having been obtained by the users, who have rented the digital still cameras 12 of this embodiment, photographing images using said digital still cameras 12.

The image server 18 is connected to an MI network 90 comprising dedicated communication lines of high speed and large capacity. Further, computers 94 (e.g., PCs) which are possessed by print finishing dealers 92 existing in large numbers all over the country are respectively connected to the MI network 90. Incidentally, the MI network 90 may be replaced with a computer network such as the Internet.

Each of the print finishing dealers 92 possesses a digital printer 96 for executing a print finishing process in which an image expressed by image data is recorded on a recording material such as photographic paper. Each of the digital printers 96 is connected to one of the computers 94 so as to be also capable of executing the print finishing process using image data, which the respective computer 94 has received via the MI network 90.

Next, the operation of this embodiment will be described. When attending an event, for example, such as a children's athletic meet or trip at which scenes are to be photographed and to be preserved as photographic prints, the user goes to a shop which handles the lending of the digital still camera 12 on a prepaid basis (the shop may be, for example, a conventional DPE or a convenience store), and he/she applies for renting the digital still camera 12.

Rental and use of the digital still camera 12 according to this embodiment is premised on the user possessing the portable terminal 14, which is capable of wireless communication with the digital still camera 12. At the shop, therefore, it is confirmed that the user possesses the previously-described portable terminal 14 (in a case where the user does not possess the portable terminal 14, the portable terminal 14 may be lent together with the digital still camera 12), and the amount of a predetermined necessary fee for renting the digital still camera 12 is communicated to the user.

When the user has paid the necessary fee, the shop affords a user ID to the user, and it delivers the digital still camera 12 to the user after writing the user ID and such information as a password and access point information (to be described later in detail) for accessing one of the image data saving areas of the storage medium 88, to the built-in memory 48 of the digital still camera 12 to be lent. Also, the shop delivers a prepaid card 98 (exemplified in FIG. 3) to the user. The prepaid card 98 bears a code for storing, in the digital still camera 12, a value representing a predetermined number of times that image data can be saved (e.g., b 50 times as indicated in Table 1) to the digital still camera 12 (saving of photographed images is permitted by storing the value). The value is hereinafter referred to as the number of times and corresponds to the number of times of the invention.

When the user places an order for printing, the shop inquires as to a location where the user receives created prints (e.g., the user's home, a convenience store near the user's house, or a DPE near the user's home), and a payment method (such as by a credit card or upon receipt of the prints). Subsequently, the shop communicates the user ID, password, photographic print receiving location, and payment method to a company managing the image server 18 and requests that the company open an image data saving area of predetermined size. Thus, the image data saving area dedicated to the user is opened on the storage area of the storage medium 88.

The prepaid card 98 according to this embodiment has the above-mentioned code printed thereon, and a coating 98A made of a material that is opaque with respect to light is formed covering a part of the prepaid card 98 where the code is printed. As indicated on the prepaid card 98 shown in FIG. 3, the code, which is revealed when the user scratches the coating 98A with a coin or the like, is inputted to the digital still camera 12 using the portable terminal 14 possessed by the user (an inputting method will be described in detail later).

Incidentally, the accepting shop may grant the user having hired the digital still camera 12 the privilege of receiving a special service, such as printing a photograph including a cartoon or other character, creating a calendar, creating a large-sized print, or creating a CD-R.

Next, the digital camera control processing which is executed by the control unit 52 when the power source of the digital still camera 12 is turned on, including processing carried out when the code is inputted, will be described with reference to flow charts of FIGS. 4A to 4D.

At step 200, it is determined whether or not display of a menu screen has been instructed by the menu switch 32 being turned on by the user. If the determination is negative, the routine proceeds to step 202, at which the control unit 52 determines whether or not the shutter button 30 has been pressed by the user. If this determination is also negative, the routine returns to the step 200, and the steps 200 and 202 are iterated until either of the decisions is affirmed.

The built-in nonvolatile memory 48 of the digital still camera 12 includes an area for storing the number of times. The digital still camera 12 according to this embodiment is constructed so as to normally operate only when the remaining number of times is not insufficient. When the digital still camera 12 is delivered from the shop to the user, a value (e.g., number of times=0) at which the digital still camera 12 ceases to operate normally is stored in the area.

Therefore, in order to bring the rented digital still camera 12 into a normally operating state (usable state), the user first turns on the menu switch 32 of the digital still camera 12 as also indicated on the prepaid card 98 shown in FIG. 3. Thus, when the user does so, the determination of the step 200 is affirmative, and the routine proceeds to step 204, at which the menu screen is displayed on the display unit 62 of the portable terminal 14.

More specifically, the control unit 52 reads, from the ROM or the like, information which expresses the menu screen as shown in FIG. 6A by way of example, and it outputs the information to the wireless communication unit 56 and instructs this unit 56 to transmit the information to the portable terminal 14. The information expressing of the menu screen, transmitted by the wireless communication unit 56, is received by the second wireless communication unit 68 of the portable terminal 14 possessed by the user. When the second wireless communication unit 68 has received any information, the control unit 60 of the portable terminal 14 analyzes the contents of the received information and executes a process corresponding to a result of the analysis. In this case, the control unit 60 judges the received information to be information for displaying a screen on the display unit 62, and it displays the menu screen on the display unit 62 by using the received information. By way of example, the menu screen according to this embodiment displays as choices, the names of processes, such as "Update the number of times", "Check a photographed image" and "Browse My Scene Folder", which the user can select to be executed.

Next, at step 206, it is determined whether or not any process has been selected by the user, and an affirmative determination is awaited. When the user inputs, via the operating unit 64 of the portable terminal 14, a number which is assigned to any of the processes displayed on the menu screen, the control unit 60 of the portable terminal 14 transmits the inputted number to the digital still camera 12 via the second wireless communication unit 68. When the control unit 52 detects reception of the number by the wireless communication unit 56, the determination of the step 206 is affirmative, and the routine proceeds to step 208.

At the step 208, it is determined which of the choices displayed on the menu screen has been selected, and the routine proceeds to one of several branches of processing in accordance with a determined result. If the user wishes to bring the rented digital still camera 12 into the usable state, the user inputs the number corresponding to the item "Update the number of times" among the choices displayed on the menu screen. When the process "Update the number of times" has been selected, the routine proceeds from the step 208 to step 210. At the step 210, the control unit 52 reads the current remaining number of times stored in the predetermined area of the built-in memory 48 and also reads information expressing a code inputting screen, from the ROM or the like. Subsequently, the control unit 52 edits the retrieved information expressing the code inputting screen, so as to include the current remaining number of times as shown in FIG. 6B by way of example, and it transmits the resulting information to the portable terminal 14 via the wireless communication unit 56. Thus, the code inputting screen is displayed on the display unit 62 of the portable terminal 14.

As previously described, when the digital still camera 12 has been delivered by the shop to the user, the value at which the digital still camera 12 cease to operate normally is stored as the current number of times. Therefore, a message, which notifies the user that the digital still camera 12 is unusable because the remaining number of times is zero, is displayed on the code inputting screen as exemplified in FIG. 6B. At a next step 212, it is determined whether or not the code has been inputted by the user, and an affirmative determination is awaited.

When the code inputting screen is displayed on the display unit 62 of the portable terminal 14, the user inputs, via the operating unit 64 of the portable terminal 14, the code which has been revealed from under the coating 98A of the prepaid card 98 by scratching the coating 98A with the coin or the like. The code inputted by the user is transmitted from the portable terminal 14 to the digital still camera 12. Thus, the determination of the step 212 is affirmative, and the routine proceeds to step 214, at which the control unit 52 determines whether or not the received code (the code inputted by the user) is an appropriate code, which conforms to a predetermined code system.

If the determination of the step 214 is negative, this step is followed by step 216. At the step 216, such an error process is executed that a message for notifying the user of the inappropriateness of the inputted code is displayed on the display unit 62 of the portable terminal 14, and the routine thereafter proceeds to the step 200. Further, the code printed on the prepaid card 98 has been formed by encoding a predetermined number of times (e.g., "50 times" as indicated in Table 1). If the determination of the step 214 is affirmative, the routine proceeds to step 218, at which the number of times expressed by the received code is written to the predetermined area provided in the built-in memory 48 of the digital still camera 12, thereby updating the current remaining number of times. As a result, the digital still camera 12 falls into the state where the user can photograph images using the camera 12.

At next step 220, the control unit 52 generates information expressing a screen for confirming the updated remaining number of times, in which a message for notifying the user of the remaining number of times updated by the processing of the step 218 is displayed, for example, as shown in FIG. 6D. Subsequently, the control unit 52 transmits the generated information to the portable terminal 14 through the wireless communication unit 56, so as to display the confirmation screen for the updated remaining number of times on the display unit 62 of the portable terminal 14. Thereafter, the routine returns to the step 200. When the user confirms the contents of the screen, the user can recognize that the rented digital still camera 12 has fallen into the usable state (a state where photographed images can be saved).

Incidentally, in this embodiment, two sorts of modes including an ordinary mode in which an image is photographed at a comparatively low resolution, and a fine mode in which an image is photographed at a comparatively high resolution, are provided for photographing images. In this embodiment, as will be described later, the number of times stored in the digital still camera 12 is updated (decreased) each time image data obtained by photographing is saved in the image data saving area. In this regard, different values are set for the respective photographing modes used when photographing images as the amount by which in the remaining number of times is decreased each time one image is saved. That is, the amount of reduction in the remaining number of times is larger when the image data obtained by photographing in the fine mode is saved, than when the image data obtained by photographing in the ordinary mode is saved. Therefore, the numbers of images which can be photographed and saved with the current remaining number of times are displayed separately for the photographing modes on the screen for confirming the updated remaining number of times as shown in FIG. 6D.

Next, processing carried out when the user photographs images using the digital still camera 12 will be described. As in the case of a conventional camera, when the user checks a subject to be photographed by viewing the optical finder 24 of the digital still camera 12 and then presses the shutter button 30, the shutter switch is turned on. Then, the determination of the step 202 is affirmative, and the routine proceeds to step 224. At the step 224, an AE (auto exposure) process is carried out in which the control unit 52 accepts image data (an image signal) transferred from the imaging device 38 via the A/D converter 42, signal processing unit 44 and data compression unit 46 to the built-in memory 48 and temporarily stored therein. Furthermore, it automatically determines an exposure on the basis of the image data, determines a shutter speed (a charge storage time of the imaging device 38) and an f-stop number in the iris, controls the actuation timing of the electronic shutter mechanism of the imaging device 38, and also drives the iris through the drive circuit 36.

At step 226, a known AF process is carried out in which a focused position (a lens position in a focused state) is searched for, whereupon a stepping motor of an AF mechanism of the lens 22 is driven so as to establish the focused state. Further, at step 228, a photographing process is carried out in which the subject is imaged by the imaging device 38 in the focused state. At next step 230, image data obtained via the A/D converter 42, signal processing unit 44 and data compression unit 46 is stored in the built-in memory 48 as photographed image data. Thereafter, the routine returns to the step 200. The above processing is iterated, whereby photographed image data are successively stored in the built-in memory 48.

Processing carried out when the user checks an image expressed by photographed image data stored in the built-in memory 48 will now be described. When checking the photographed image, the user turns on the menu switch 32, thereby to display the menu screen on the display unit 62 of the portable terminal 14, and further selects the item "Check a photographed image", displayed as one of the choices on the menu screen. The result of the selection is transmitted from the portable terminal 14 to the digital still camera 12, whereby the routine proceeds from the step 208 to step 232.

In this embodiment, the process "Check a photographed image" is executed in such a way that a plurality of images are concurrently displayed (as an index) as candidates for checking on the display unit 62 of the portable terminal 14, and that only the image selected by the user is enlarged and displayed (as a thumbnail image).

At the step 232, therefore, a predetermined number of (a plurality of) photographed image data stored in the built-in memory 48 have their resolution transformed into that for the index display by the data compression unit 46, and after the resolution transformation the image data are arrayed in a matrix shape as shown, fore example, in FIG. 6E, thereby to generate index image data for concurrently displaying the plurality of images, expressed by the photographed image data, on the display unit 62 of the portable terminal 14.

Further, information expressing of an image selection screen is generated by adding a message for prompting the user to select one of the images, as shown in FIG. 6E, and the generated information is transmitted to the portable terminal 14 via the wireless communication unit 56, whereby the image selection screen is displayed on the display unit 56 of the portable terminal 14. At the next step 234, it is determined whether or not any instruction has been inputted by the user, and when the determination is affirmative, the routine proceeds to one of several branches of processing in accordance with a content of the inputted instruction.

When the image selection screen is displayed on the display unit 62 of the portable terminal 14, the user determines whether or not the image to be checked is included among the plurality of images presented as the index display. If the image to be checked is not included, the user inputs an instruction for scrolling (changing-over) the image selection screen, via the operating unit 64 of the portable terminal 14. If the image to be checked is included, the user inputs a number affixed to the image, via the operating unit 64 of the portable terminal 14 in order to display a thumbnail image of the pertinent image.

The instruction inputted by the user is transmitted from the portable terminal 14 to the digital still camera 12. In a case where the instruction for changing-over (scrolling) the screen has been given by the user, the routine returns from the step 234 to the step 232, in which information expressive of the image selection screen is generated using photographed image data of a plurality of other images (not yet displayed), and the generated information is transmitted to the portable terminal 14, thereby to change-over the image selection screen displayed on the display unit 62 of the portable terminal 14.

If the number of the specified image has been inputted by the user, the routine proceeds from the step 234 to step 236. At the step 236, information expressing an image check screen is generated in such a way that the photographed image data of the image corresponding to the number inputted by the user has its resolution transformed into that for thumbnail image display by the data compression unit 46, and that a message for asking the user whether or not the pertinent image is to be saved in My Scene Folder (the image data saving area) or a PC (possessed by the user) is added as shown, for example, in FIG. 6F. The generated information is transmitted to the portable terminal 14 via the wireless communication unit 56, thereby to display the image check screen on the display unit 62 of the portable terminal 14. Incidentally, the step 236 corresponds to a transfer component in the second aspect.

In this way, it is possible to check the content of the image photographed by the user, on the basis of the thumbnail image enlarged and displayed on the display unit 62. Portable telephones, each of which being usable as the portable terminal 14 according to this embodiment, have been registered in a number larger than 60,000,000 as of September 2000 and have come to be owned at a rate of one for every two Japanese citizens. The present-day portable telephone includes an LCD, which can display an image of about 100,000 pixels. When an LCD having such a display resolution is employed as the display unit 62, the image can be displayed with a display quality, which is satisfactory for displaying the thumbnail image and checking the content thereof. Incidentally, the thumbnail image which is displayed on the display unit 62 by the image check screen may be successively changed-over in accordance with the user's scroll instructions, without displaying the index images on the display unit 62 in the image selection screen as described above.

At next step 238, it is decided whether or not the user has given an instruction for saving, in the My Scene Folder or the PC, the image displayed on the display unit 62 in the image check screen. In this embodiment, the capacity of the built-in memory 48 is set comparatively low for the purpose of offering the digital still camera 12 to the user at low cost, and it is difficult to save photographed image data for a large number of images in the built-in memory 48. In this embodiment, therefore, it is recommended to the user that he/she save his/her favorite images in the image data saving area (in this embodiment, the name "My Scene Folder", directed toward the user, is given to the image data saving area) or in his/her own PC, and the message for inquiring whether or not the image is to be saved in the My Scene Folder or the PC is added to the image check screen as described before.

If the user has selected not to save the image, the determination of the step 238 is negative, and the routine returns to the step 200 without executing any process. Incidentally, a step may be inserted into the routine at which a message for asking of the user whether or not the corresponding photographed image data is to be erased from the built-in memory 48 is displayed, whereupon the photographed image data is erased from the built-in memory 48 subject to an instruction to carry out the erasing.

On the other hand, if the user has given an instruction to save the image displayed on the display unit 62 by the image check screen, the determination of the step 238 is affirmative, and the routine proceeds to step 240. At the step 240, it is determined whether or not the remaining number of times is sufficient for saving the photographed image data of the image indicated for saving with reference to the remaining number of times stored in the predetermined area of the built-in memory 48, thereby to determine whether or not the digital still camera 12 is in a state where it can save the photographed image data of the pertinent image.

If the determination is negative, the routine returns to the step 200 without executing any process. In this way, the photographed image data can be prevented from being saved in the image data saving area or the user's PC in a state where the remaining number of times is insufficient. Incidentally, if the determination of the step 240 has been negated, the reason why the camera 12 is unusable (the insufficiency of the number of times) may be displayed as a message on the display unit 62 of the portable terminal 14. The step 240 corresponds to a management component in each of the first and second aspects.

If the determination of the step 240 is affirmative, the routine proceeds to step 241. At the step 241, a message inquiring as to which of the My Scene Folder and the user's PC the selected image is to be saved in is displayed on the display unit 62, and the save destination for the image is determined on the basis of an instruction which the user having, referred to the message, has inputted via the operating unit 64 of the portable terminal 14.

If the user's PC has been designated as the save destination for the image, the routine proceeds from the step 241 to step 249. At the step 249, the control unit 52 requests the user to connect the digital still camera 12 and the user's PC via a communication cable, and it transfers the photographed image data of the image to the user's PC in a state where the digital still camera 12 and the user's PC are electrically connected via the communication cable, thereby to save the photographed image data in a built-in hard disk drive (HDD) or the storage medium of the user's PC. Thereafter, the routine proceeds to step 250. Incidentally, the step 249 corresponds to a save control component in each of the first and second aspects.

On the other hand, if the My Scene Folder has been designated as the save destination for the image, the routine proceeds from the step 241 to step 242, at which access point determination processing is executed. The access point determination processing will be described with reference to the flow chart of FIG. 5.

At step 300, the control unit 52 transmits, to the portable terminal 14 via the wireless communication unit 56, information for requesting the portable terminal 14 to transfer positional information expressing the current position of the portable terminal 14 (as well as that of the digital still camera 12), thereby to inquire of the portable terminal 14 about the current position. At next step 302, whether or not the positional information has been received from the portable terminal 14 is determined, and an affirmative determination is awaited.

The control unit 60 of the portable terminal 14 analyzes the content of information received from the digital still camera 12 via the second wireless communication unit 68. Upon determining, as the result of the analysis, that the received information is the request for transferring the positional information, the control unit 60 reads the positional information stored in a built-in memory (not shown) and transmits the read information to the digital still camera 12 via the second wireless communication unit 68. When the positional information has been received by the digital still camera 12, the determination of the step 302 is affirmative, and the routine proceeds to step 304.

In this embodiment, the photographed image data selected to be saved is saved in the image data saving area as described below. The control unit 52 of the digital still camera 12 causes the portable terminal 14 to dial a specified one of the access points 86 of a specified Internet provider (e.g., a provider with which a company conducting the business of lending the digital still camera 12 to the user has contracted), thereby to secure a communication line between the portable terminal 14 and the specified access point 86. Thereafter, the control unit 52 is connected to the Internet 16 via the secured communication line and the specified access point 86, and it accesses the image server 18 and performs formalities such as authentication of the user ID and password stored in the built-in memory 48. Thereafter, the control unit 52 transfers the photographed image data to be saved to the image server 18.

Since the digital still camera 12 and portable terminal 14 according to this embodiment are equipment carried by the user, a position thereof (current position) is not fixed. Therefore, if a communication cost between the access point 86 and the portable terminal 14 differs depending upon, for example, the distance between them, it is preferable from a stand point of suppressing the communication cost that the portable terminal 14 is connected to the Internet 16 via the access point 86 nearest to the current position among the numerously provided access points 86.

In the digital still camera 12 according to this embodiment, therefore, access point information in which telephone numbers of the access points 86 in individual regions by the specified Internet provider along with corresponding information for specifying the respective regions, is written into the built-in memory 48 by the shop when the camera 12 is delivered to the user. Accordingly, the built-in memory 48 corresponds also to a positional information storage component in the first aspect. When the positional information has been received from the portable terminal 14, the determination of the step 302 is affirmative, and the routine proceeds to the step 304, at which the control unit 52 searches for the access point 86 nearest to the current position, by referring to the access point information and using the received positional information as a key. At a succeeding step 306, the telephone number of the nearest access point 86 searched for at the step 304 is stored in the RAM or the like. Thereafter, the routine proceeds to step 244 of the digital camera control processing (FIGS. 4A–4D).

At the step 244, log-in processing is executed for receiving the service offered by the image server 18. More specifically, the control unit 52 causes the portable terminal 14 to dial the telephone number of the nearest access point 86 stored in the RAM or the like, by the first wireless communication unit 66, thereby to secure the communication line between the portable terminal 14 and the nearest access point 86 and to connect the portable terminal 14 to the Internet 16 via the secured communication line and the specified access point 86 (in the connection, it is possible to use, for example, a user ID and password determined between the portable terminal 14 and the specified Internet provider beforehand). Subsequently, the control unit 52 accesses the image server 18 by designating the URL (Uniform Resource Locator) of the image server 18 and transmits the user ID and password stored in the built-in memory 48, to the image server 18. Thus, the user renting the digital still camera 12 is authenticated by the image server 18 and is thereby able to use the service offered by the image server 18.

At step 246, the photographed image data to be saved in the image data saving area is transferred to the image server 18 via the portable terminal 14, specified access point 86 and Internet 16. When the transfer has been completed, the control unit 52 awaits reception of an acknowledgment from the image server 18 at next step 248.

Incidentally, in this embodiment, a fee charged for the communication between the portable apparatus 14 and the access point 86 may be included in the fee, which the user pays for renting the digital still camera 12, or it may be separately paid by the user. For the communication between the portable apparatus 14 and the access point 86, it is possible to employ, for example, packet communication, in which data is divided into fixed amounts, headers with destinations and the like set therein are affixed to respective packets obtained by the division, and the resulting packets are transmitted. As of August 2000, however, a communication fee of 0.3 yen per packet (128 bytes per packet) is charged for the packet communication service offered by NTT EAST in Japan. Therefore, assuming that each image is composed of 1280×960 pixels and has a data size of 312 kB, a communication fee as large as 731.25 yen (312 kB÷128B=2437.5 packets; 2437.5 packets×0.3 yen=731.25 yen) is charged each time the image data for one image is transferred, and the communication is very expensive.

On the other hand, with a PHS channel that has a communication speed of 64 kbps, which is equal to that of an ISDN line, an amount of time required to transfer 312 kB of data is on the order of several tens of seconds, and a communication fee is, for example, about 10 yen for 18 seconds, so that data for one image can be transferred for a communication fee of about 40 yen. Further, according to a new standard for portable telephones called"IMT2000", transfer speeds are 2 Mbps indoors, 384 kbps when moving at a low speed and 144 kbps when moving at a high speed, and 312 kB of data can be instantly transmitted, so that a fee for transfer of the image data is sharply reduced.

Accordingly, in light of the fact that, owing to the access point determination processing described before, the image data is transferred via the access point 86 nearest to the current position at any time, the fee which the user pays for renting the digital still camera 12 is largely based on the number of images to-be-photographed (and a duration of use).

When the photographed image data has been transferred from the digital still camera 12, the image server 18 saves the transferred photographed image data in the image data saving area which has been opened exclusively for the user authenticated before. Further, when the saving in the image data saving area has been completed, the image server 18 sends an acknowledgment back to the image data transfer source, thereby to notify the source that the transferred photographed image data has been saved.

In this manner, the steps 238, 242, 244 and 246 correspond to the save control component in the first aspect, and the access point determination processing of the step 242 and the log-in processing of the step 244 correspond specifically to the save control component.

When the control unit 52 is notified by the portable terminal 14 that the acknowledgment has been received from the image server 18, the determination of the step 248 is affirmative, and the control unit 52 cuts off the communication between the portable terminal 14 and the specified access point 86. Thereafter, the routine proceeds to the step 250, at which the remaining number of times stored in the predetermined area of the built-in memory 48 is updated (decreased) in accordance with the data amount (the photographing mode used when the image was photographed) of the photographed image data transferred to the image server 18 or the user's PC. Incidentally, in a case where photographed image data that has already been saved in either of the save destinations (the My Scene Folder and the user's PC) is saved in the other save destination, the updating (reduction) of the remaining number of times at the step 250 may be omitted.

Figure 6G:
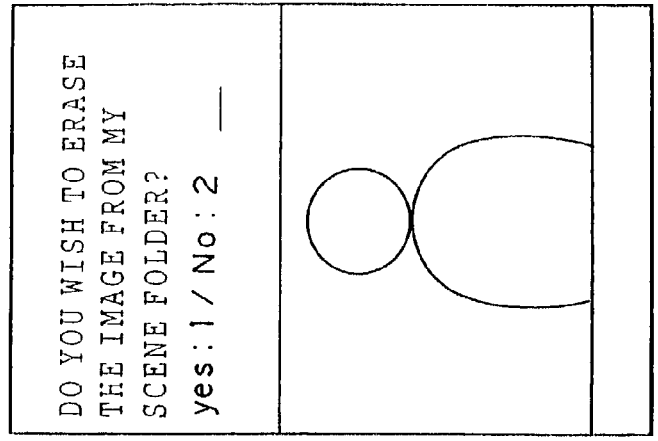

At next step 252, the control unit 52 reads from the ROM or the like, information expressing a save confirmation screen, which notifies the user that the photographed image data selected to be saved has been saved in the image data saving area (or the user's PC) and to which a message for notifying the user of the remaining number of times is added, as shown in FIG. 6G by way of example. It then transmits the resulting information to the portable terminal 14, whereby the save confirmation screen is displayed on the display unit 62 of the portable terminal 14, and the routine returns to the step 200. Thus, the user can recognize that the image (the photographed image data thereof) previously selected to be saved has been saved in the My Scene Folder (or the user's PC).

Incidentally, the photographed image data, for which saving in at least one of the My Scene Folder and the user's PC has been completed, may be automatically erased from the built-in memory 48. Furthermore, the automatic erasure is preferable.

In the case of the conventional camera with which a silver halide photographic film is exposed so as to record images, the number of images which can be photographed (e.g., 12, 24 or 36) is determined by the length of the loaded photographic film, and it is necessary when photographing a large number of images to prepare a large number of rolls of the photographic film beforehand. In order to check the photographed images, it is also necessary to take the photographic film out of the camera, to request developing, and the like. In contrast, in the case of the digital still camera 12 according to this embodiment, the contents of photographed images can be immediately checked, as in the case of an ordinary digital still camera, and it is possible to save only favorite ones from among the photographed images in the My Scene Folder (the image data saving area) or the user's PC. Moreover, assuming, for example, that the capacity of the image data saving area is 64 MB, images can be saved in as large a number as 198 (in the case where each image is composed of 1280×960 pixels and has a data size of 312 kB).

Incidentally, the size of the image data saving area per user may, of course, be set so as to allow each user to save several tens of images, on the premise that orders for printing of the images selected to be saved in the image data saving area will be place in the short term. For example, in the case where the amount of data per image is 312 kB, a size of the image data saving area may be set at 8 MB in order to allow storage of 25 images.

As described above, according to this embodiment, the processing (such as the determination of the access point and the updating of the remaining number of times) relevant to the saving of the image data in the image data saving area are executed by the digital still camera 12, so that the portable terminal 14 need not always be a predetermined equipment. Accordingly, this also serves to cope with the fast that the digital still camera 12 according to this embodiment is used conjointly by a plurality of users.

Next, processing carried out when the user browses the images saved in the My Scene Folder (the image data saving area) will be described. In this case, the user displays the menu screen on the display unit 62 of the portable terminal 14 by turning on the menu switch 32 and further selects the item "Browse My Scene Folder" displayed as one of the choices within the menu screen. The result of the selection is transmitted from the portable terminal 14 to the digital still camera 12, whereby the routine proceeds from the step 208 to step 254.

The access point determination processing described before is executed at the step 254, and the log-in processing described before is executed at the next step 256, thereby to allow the portable terminal 14 to receive the service offered by the image server 18. At a succeeding step 258, the control unit 52 requests the image server 18 to transfer, for browsing, the thumbnail image data of a predetermined number of (a plurality of) images among the images whose photographed image data are saved in the image data saving area. At step 260, it is determined whether or not the image data has been received from the image server 18, and an affirmative determination is awaited.

When the control unit 52 is notified by the portable terminal 14 that the predetermined thumbnail image data has been received from the image server 18, the determination of the step 260 is affirmative, and the routine proceeds to step 262. At the step 262, the predetermined number of thumbnail image data received has its resolution transformed into one for an index display by the data compression unit 46, the image data, after the resolution transformation, are arrayed in a matrix so as to generate index image data, and a message for prompting the user to select one of the images is added, thereby to generate information expressing an image selection screen as shown in FIG. 6E. The generated information is transmitted to the portable terminal 14, thereby to display the image selection screen on the display unit 62 of the portable terminal 14.

At next step 264, it is determined whether or not any instruction has been inputted by the user is decided, and the routing proceeds to one of several branches of processing in accordance with the content of the inputted instruction when the determination is affirmative.

When the image selection screen is displayed on the display unit 62 of the portable terminal 14, the user decides whether or not the image to be enlarged and checked is included among the plurality of images presented in the index. If the image to be checked is not included, the user inputs the instruction for scrolling (changing-over) the image selection screen, via the operating unit 64 of the portable terminal 14. If the image to be checked is included, the user inputs a number affixed to the image, via the operating unit 64 of the portable terminal 14 in order to enlarge and display the pertinent image (to display a thumbnail image of the image).

The instruction inputted by the user is transmitted from the portable terminal 14 to the digital still camera 12. If the instruction for changing-over (scrolling) the screen has been given by the user, the routine returns from the step 264 to the step 258. At the step 258, the control unit 52 requests the image server 18 to transfer image data for a predetermined number of other thumbnail images (not yet transferred), and it generates information expressing of the image selection screen by using the transferred thumbnail image data and transmits the generated information to the portable terminal 14 at the step 262, thereby to change-over the image selection screen displayed on the display unit 62 of the portable terminal 14.

Figure 6H:
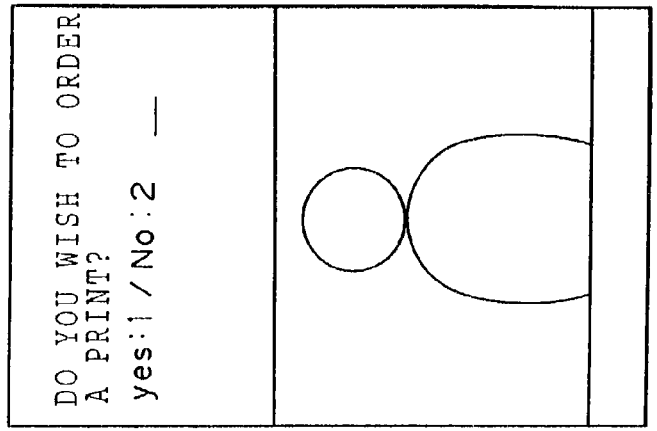

Subsequently, if the number for the specified image has been inputted by the user, the routine proceeds to step 266. At the step 266, the control unit 52 generates information expressing a browse screen in such a way that, as shown, for example in FIG. 6H, a message for asking the user whether or not printing is to be ordered is added to the thumbnail image data of the image corresponding to the number inputted by the user. The control unit 52 transmits the generated information to the portable terminal 14 via the wireless communication unit 56, thereby to display the browse screen on the display unit 62 of the portable terminal 14.

Thus, the user is permitted to browse the images saved in the My Scene Folder (the image data saving area), on the basis of the thumbnail image enlarged and displayed on the display unit 62. Incidentally, a displayed image may be successively changed-over in accordance with scrolling instructions, entered by the user by displaying the thumbnail image from the beginning without displaying the index images as described above. Also, since the images saved in the image data saving area are ones, which the user has previously selected to be saved in the My Scene Folder after confirming the contents thereof, another possibility is to only present the index display.

Incidentally, the image server 18 according to this embodiment also offers a service, which permits an acquaintance (e.g., a friend or relative in a distant place) of a specified user to browse images saved in the My Scene Folder by the specified user. For example, the acquaintance of the specified user can access the image server 18 through a PC, portable apparatus for connecting to the Internet 16, or the like, and after transmitting a user ID and a password, received from the specified user, to the image server 18, the acquaintance is permitted to receive the service and to browse the images saved in the specified user's My Scene Folder, in the same way as stated above.

At next step 268, the control unit 52 determines whether or not the user has placed an order for printing the image displayed on the display unit 62 on the browse screen. If the user has selected not to place an order for printing, the determination is negative, and the routine proceeds to step 278. On the other hand, if the user has selected to place an order for printing, the determination is affirmative, and the routine proceeds to step 270. At the step 270, the control unit 52 reads from the ROM or the like, information expressing a printing order screen (not shown), which prompts the user to input information (a number and size of the prints) required for placing the order for printing, and it transmits the read information to the portable terminal 14, thereby to display the printing order screen on the display unit 62 of the portable terminal 14.

At next step 272, it is determined whether or not the information necessary for the order for printing has been inputted by the user, and an affirmative determination is awaited. When the user has inputted the information necessary for the order for printing through the operating unit 64 and the information has been received via the portable terminal 14, the determination of the step 272 is affirmative, and the routine proceeds to step 274. At the step 274, information specifying the image for which the order for printing has been placed is added to the information inputted by the user, and the resulting printing order information is transmitted to the image server 18. At step 276, the control unit 52 causes the display unit 62 of the portable terminal 14 to display a message for notifying the user of the completion of the order for printing, and the user is thus notified.

The image server 18, having received the printing order information, selects the print finishing dealer 92 to receive the current order for printing (e.g., the print finishing dealer nearest to the home of the user who has given the order or to a location where the user will receive the prints) from among the large number of print finishing dealers 92 connected to the image server 18 via the MI network 90. The image server 18 then transmits the received printing order information, the photographed image data of the image for which the order for printing has been placed, and information such as the print receiving location and a payment method designated by the user, to the computer 94 of the selected print finishing dealer 92 via the MI network 90.

Accordingly, the selected print finishing dealer 92 creates photographic prints using the digital printer 96, based on the photographed image data received from the image server 18 and in accordance with the received printing order information, and makes arrangements for the created photographic prints to be delivered to the user at the receiving location designated by the user, in exchange for payment via the payment method designated by the user. Thus, the user need not go to the DPE to place the order for printing, and the user can receive the order (the created photographic prints) at the designated receiving location by paying via the designated payment method.

Figure 6I:
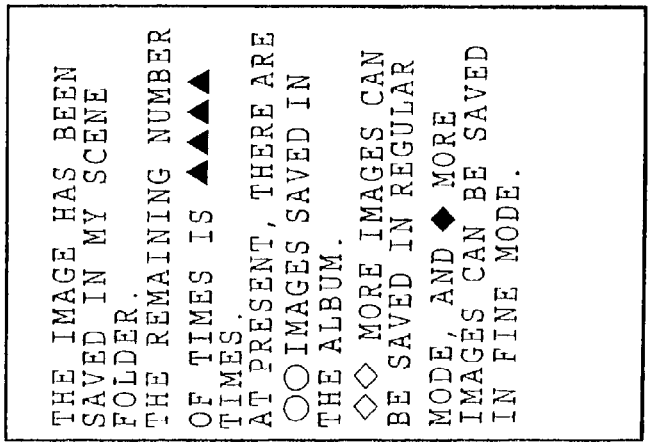

At next step 278, the control unit 52 causes the display unit 62 of the portable terminal 14 to display a message asking the user whether or not the photographed image data of the image enlarged and displayed on the display unit 62 of the portable apparatus on the browse screen is to be erased from the My Scene Folder (the image data saving area) (see FIG. 6I). The step 278 is followed by step 280, at which the control unit 52 determines whether or not the erasing has been selected by the user. Incidentally, the number of addition images, which can be saved in the My Scene Folder, may also be displayed on the display unit 62 at this point.

If the user has selected not to erase the photographed image data of the pertinent image from the My Scene Folder, the determination of the step 280 is negative, and the communication between the portable terminal 14 and the specified access point 86 is cut off, whereupon the routine returns to the step 200. On the other hand, if the user has selected to erase the photographed image data of the pertinent image, the determination of the step 280 is affirmative, and the routine proceeds to step 282. At the step 282, the control unit 52 transmits information, specifying the image to be erased, to the image server 18, whereby the image server 18 is instructed to erase the photographed image data of the image to be erased from the image data saving area.

At next step 284, it is determined whether or not an acknowledgment from the image server 18 has been received, and an affirmative determination is awaited. When the control unit 52 has received, from the image server 18, notification that the photographed image data of the previously selected image has been erased, the determination of the step 284 is affirmative, and the routine proceeds to step 286. At the step 286, the control unit 52 displays, on the display unit 62 of the portable terminal 14, a message for notifying the user that the erasure of the photographed image data has been completed, whereupon the routine returns to the step 200.

Further, the digital still camera 12 according to this embodiment can also update the number of times in such a way that, when the remaining number of times has become zero or approximately zero, the user goes to the lending shop and pays an additional fee for updating the number of times of the digital still camera 12.

In this case, the control unit 52 displays the code input screen (see FIG. 6B) on the display unit 62 of the portable terminal 14 (if the number of times is not equal to 0, a screen such as that shown in FIG. 6C is displayed), and the user inputs a code printed on the prepaid card 98, which the user has received from the shop by paying the additional fee via the operating unit 64 of the portable terminal 14. Then, at the step 218, the additional number of times expressed by the inputted code is added to the current remaining number of times, whereby the number of times of the digital still camera 12 is updated. Incidentally, the above contrivance corresponds to a third aspect of the invention.

In the foregoing, the portable telephone has been used as an example of the portable terminal 14, which corresponds to the communication apparatus in the first aspect and the image display apparatus in the second aspect. However, the present invention is not restricted to the portable telephone, and it is also possible to employ, for example, a PDA, a wearable computer or a mobile computer as the portable terminal 14.

Furthermore, in the foregoing, a case has been described in which limits are not particularly set for the number of images which can be photographed by the digital still camera 12, a length of time that the digital still camera 12 is used, and a length of time that the My Scene Folder is opened, and in which the number of times to be written into the digital still camera 12 and the size of the My Scene Folder are held constant. However, the present invention is not restricted to such a case, and it is also possible that limits be set for the number of images which can be photographed, the length of time that the digital still camera 12 is used, and the length of time that the My Scene Folder is opened, and that the number of images which can be photographed, the length of time that the digital still camera 12 is used, the number of times to be written into the digital still camera 12, the length of time that the My Scene Folder is opened, and the size thereof be altered as desired by the user and in accordance with a fee paid by the user.

When the above parameters are made alterable and are determined by the user (in accordance with the fee paid by the user), the advantages described below are obtained. For example, a user, who only intends to use the digital still camera 12 at a specific event, can set the number of images, which can be photographed at a required minimum value, which can cover the number of images the user plans to photograph at the event. Also, the user, for example, who intends to order enlarged prints of photographed images, can set the size of the My Scene Folder to sufficiently accommodate the data of high resolution images obtained by using the fine mode. Similarly, the user, for example, who intends to immediately place an order for prints of favorite photographed images, can make the size of the My Scene Folder comparatively small. Thus, when the parameters are alterable and set in accordance with the fee paid by the user, a cost to the user, who rents the digital still camera 12, can be suppressed to a required minimum corresponding to the manner in which the user intends to use the same. Incidentally, the above contrivance corresponds to the third aspect.

Further, in the foregoing, a case has been described, in which, when the remaining number of times is insufficient, photographed image data is prevented from being saved in the My Scene Folder or the user's PC. However, the present invention is not restricted to such a case, and photographing of images with the digital still camera 12 may be prevented instead of the saving of photographed image data. It is also possible to prevent both the photographing of images and the saving of photographed image data when the number of times is insufficient.

Further, in the foregoing, a case has been described, in which orders for printing of respective images saved in the image data saving area are placed, merely by designating the number of prints and the size thereof. However, the present invention is not restricted to such a case, and it is possible to allow orders for trimming, the creation of a template, the creation of a post card, and the like. With regard to the portable telephone, which is usable as the portable terminal 14 according to this embodiment, there are models available, which adopt a TFT color liquid-crystal panel as the display unit 62 and can display images at high resolution and high quality. When such a model is utilized, it can be readily implemented that the user places the above order, which is presently accepted by a machine dedicated to orders for photographs, while checking an image expressing the result of the order as displayed on the display unit 62 of the portable terminal 14.

Further, a case has been described above, in which the prepaid card 98 is attached when the digital still camera 12 is lent to the user and the user personally writes the number of times into the digital still camera 12. However, the present invention is not restricted to such a case, and the number of times or the like may be written into the digital still camera 12 by the accepting shop.

Further, a case there has been described above in which the prepaid card 98 is also employed for updating the number of times. However, the present invention is not restricted to such a case, and it is also possible for the number of times to be update in such a way that the user pays with a credit card or the like without going to the accepting shop. Also, the number of times may be updated free of charge as a service to a user who has placed an order for printing. Moreover, the image photographing system may be constructed so that the number of times is automatically updated by inserting, into the digital still camera 12, a recording medium (for example, a SMART MEDIA, a COMPACT FLASH or a MEMORY STICK), in which information for updating the number of times is recorded (the information should preferably be encrypted code information).

Further, it is needless to say that the user interfaces described with reference to FIGS. 6A–6I are simply examples, and that they can be appropriately altered.

Besides, in the foregoing, the digital still camera which photographs and records still images has been exemplified as the image photographing device according to the present invention. However, some digital video cameras have the function of photographing and recording still images or the function of extracting a still image from a photographed and recorded moving image, and such a digital video camera may well be employed as the image photographing device according to the present invention.

Besides, the image data according to the present invention is not restricted to image data expressive of a still image, but it may well be image data expressive of a dynamic image. Although a digital video camera is well suited to photograph and record a dynamic image, some digital still cameras can photograph and record a dynamic image for a comparatively short time (for example, with a digital still camera "FinePix6800Z" manufactured by Fuji Photo Film Co., Ltd., a dynamic image with sound, continuing for at most about 160 seconds, can be photographed under conditions of 320×240 pixels and 10 frames per second), and also a dynamic image of comparatively short time can be photographed and recorded by employing the camera as the image photographing device according to the present invention.

Assuming by way of example that the capacity of the built-in memory be 16 MB as indicated in Table 1, a dynamic image for 94 seconds (in the case of 320×240 pixels per frame and 10 frames per second) can be recorded. In this case, if the total number of times is 50 times by way of example, a dynamic image to be saved may have the number of times calculated and managed in accordance with (94 seconds)/(50 times), which is nearly equals to (1.9 second)/time. Incidentally, the image photographing system can be so constructed that the extraction (editing) of the dynamic image to-be-saved from the photographed and recorded dynamic image is done by, for example, the portable terminal 14 in compliance with an instruction which the user inputs through the operating unit 64 of the portable terminal 14 in a state where the dynamic image is held displayed on the display unit 62.

What is claimed is:

1. An image photographing system comprising:
   an image server connected to a computer network;
   image saving areas managed by the image server;
   a communication apparatus for communicating with the image server; and
   an image photographing device that includes
      a photographing component, which converts an optical image into image data,
      a built-in storage component in which the image data is temporarily stored,
      a first communication component, which can communicate with the communication apparatus,
      a save control component which saves the image data, photographed by the photographing component and temporarily stored in the storage component, in the image saving area by the communication apparatus, in such a way that the image data is transferred to the communication apparatus via the first communication component when an instruction is given for the image data to be saved, and
      a management component which stores the number of times written according to a predetermined procedure, which updates the stored number of times each time the save control component saves the image data, and which prevents at least one of the photographing by the photographing component and the saving of the image data by the save control component when the number of times has become equal to a predetermined value, wherein, as an equivalent for a rental fee paid by a user, the image photographing device is lent to the user after the number of times has been written into the image photographing device according to the predetermined procedure, or after attaching information required for the user to personally write the number of times into the image photographing device according to the predetermined procedure, and one of the image saving areas is opened and dedicated to the user, the user is allowed to browse, via the communication apparatus, the images expressed by the image data which the user has saved in the image saving area dedicated to the user, and when an order has been placed via the communication apparatus by the user, for printing a specified one of the images expressed by the image data saved in the image saving area, a photographic print is created by employing the image data saved in the image saving area, whereupon the created photographic print is delivered to the user.

2. An image photographing system of claim 1, wherein the communication apparatus is further used for displaying image expressed by the image data obtained by the photographing component.

3. An image photographing system of claim 1 wherein the instruction given for the image data to be saved is user-selectable.

4. An image photographing system of claim 1, wherein a destination for the image data to be saved is selectable between two or more devices.

5. An image photographing device comprising:
 a photographing component, which converts an optical image into image data;
 a built-in storage component in which the image data is temporarily stored;
 a first communication component, which can communicate with a communication apparatus for communicating with an image server, connected to a computer network;
 a save control component which saves the image data, photographed by the photographing component, and temporarily stored in the storage component, in a predetermined image saving area managed by the image server, by means of the communication apparatus, in such a way that the image data is transferred to the communication apparatus through the first communication component when an instruction is given for the image data to be saved; and
 a management component which stores the number of times written in a predetermined procedure, which updates the stored number of times each time the save control component saves the image data, and which prevents at least one of the photographing by the photographing component and the saving of the image data by the save control component when the number of times has become equal to a predetermined value, wherein:
the communication apparatus, which can be carried by the user;
the image photographing device comprises a positional information storage component in which positions of a plurality of access points for permitting the communication apparatus to communicate with the image server are stored; and the save control component acquires information expressing a current position from the communication apparatus, determines the nearest one of the access points on the basis of the acquired information and the information stored in the positional information storage component, and controls the communication apparatus so that the image data can be saved in the predetermined image saving area via the determined nearest access point.

6. An image photographing device comprising:
 a photographing component, which converts an optical image into image data;
 a built-in storage component in which the image data is temporarily stored;
 a first communication component, which can communicate with a communication apparatus for communicating with an image server, connected to a computer network;
 a save control component which saves the image data, photographed by the photographing component, and temporarily stored in the storage component, in a predetermined image saving area managed by the image server, by means of the communication apparatus, in such a way that the image data is transferred to the communication apparatus through the first communication component when an instruction is given for the image data to be saved;
 a management component which stores the number of times written in a predetermined procedure, which updates the stored number of times each time the save control component saves the image data, and which prevents at least one of the photographing by the photographing component and the saving of the image data by the save control component when the number of times has become equal to a predetermined value;
 a second communication component that can perform wireless communication with a portable image display apparatus, which is provided with a display unit capable of displaying an image and which performs wireless communication; and
 a transfer component which transfers the image data to the image display apparatus via the second communication component by wireless communication so that the image expressed by the image data obtained by the photographing carried out by the photographing component can be displayed on the display unit of the image display apparatus.

7. The image photographing device of claim 6, wherein the transfer component generates thumbnail image data, having a lower resolution than that of the image data obtained by the photographing carried out by the photographing component, and transfers the generated thumbnail image data to the image display apparatus.

8. The image photographing device of claim 6, wherein the portable type image display apparatus is one selected from the group consisting of a portable telephone, a PDA, a wearable computer and a mobile computer, which is possessed by the user.

9. An image photographing device comprising:
 a photographing component, which converts an optical image into image data;
 a built-in storage component in which the image data is temporarily stored;
 a save control component which saves the image data, photographed by the photographing component and temporarily stored in the storage component, in a storage medium built into or connected to a predetermined external equipment, by reading the image data and transferring it to the predetermined external equipment when an instruction is given for the image data to be saved;

a management component which stores a number of times written according to a predetermined procedure, which updates the stored number of times each time the save control component saves the image data, and which prevents at least one of the photographing by the photographing component and the saving of the image data by the save control component when the number of times has become equal to a predetermined value;

a second communication component that can perform wireless communication with a portable image display apparatus, which is provided with a display unit capable of displaying an image and which performs wireless communication; and a transfer component which transfers the image data to the image display apparatus via the second communication component by wireless communication so that the image expressed by the image data obtained by the photographing carried out by the photographing component can be displayed on the display unit of the image display apparatus.

10. The image photographing device of claim 9, wherein the transfer component generates thumbnail image data, having a lower resolution than that of the image data obtained by the photographing carried out by the photographing component, and transfers the generated thumbnail image data to the image display apparatus.

11. The image photographing device of claim 9, wherein the portable type image display apparatus is one selected from the group consisting of a portable telephone, a PDA, a wearable computer and a mobile computer, which is possessed by the user.

12. An image photographing and ordering method comprising the steps of:

lending an image photographing device to a user as an equivalent for a rental fee paid by the user, after a number of times has been written into the image photographing device according to a predetermined procedure, or after attaching information required for the user to personally write the number of times into the image photographing device according to the predetermined procedure, and also opening an image saving area, which is dedicated to the user and managed by an image server connected to a computer network;

allowing the user to browse, via a communication apparatus, images expressed by image data which the user has saved in the image saving area dedicated to the user; and when an order has been placed via the communication apparatus by the user for printing a specified one of the images expressed by the image data saved in the image saving area, creating a photographic print using the image data saved in the image saving area, and delivering the created photographic print to the user;

wherein the image photographing device comprises a photographing component, which converts an optical image into image data, a built-in storage component in which the image data is temporarily stored, a first communication component, which can communicate with the communication apparatus for communicating with the image server, connected to the computer network, a save control component which saves the image data, photographed by the photographing component and temporarily stored in the storage component, in the predetermined image saving area managed by the image server, by means of the communication apparatus, in such a way that the image data is transferred to the communication apparatus via the first communication component when an instruction is given for the image data to be saved, and a management component which stores the number of times written according to the predetermined procedure, which updates the stored number of times each time the save control component saves the image data, and which prevents at least one of the photographing by the photographing component and the saving of the image data by the save control component when the number of times has become equal to a predetermined value.

13. The image photographing and ordering method of claim 12, wherein at least, the number of times to be written into the image photographing device is altered in accordance with the rent paid by the user.

14. The image photographing and ordering method of claim 12, wherein, when the user has paid an additional fee, the number of times stored in the image photographing device is rewritten according to a predetermined procedure, or information required for the user to personally rewrite the number of times into the image photographing device according to the predetermined procedure is given to the user.

15. An image photographing and ordering method comprising the steps of:

lending an image photographing device to a user as an equivalent for a rental fee paid by the user, after the number of times has been written into the image photographing device according to a predetermined procedure, or after attaching information required for the user to personally write the number of times into the image photographing device according to the predetermined procedure, and also opening an image saving area, which is dedicated to the user and managed by an image server connected to a computer network;

allowing the user to browse, via a communication apparatus, images expressed by image data which the user has saved in the image saving area dedicated to the user; and when an order has been placed via the communication apparatus by the user for printing a specified one of the images expressed by the image data saved in the image saving area, creating a photographic print using the image data saved in the image saving area, and delivering the created photographic print to the user;

wherein the image photographing device comprises a photographing component, which converts an optical image into image data, a built-in storage component in which the image data is temporarily stored, a save control component which saves the image data, photographed by the photographing component and temporarily stored in the storage component, in a storage medium built into or connected to a predetermined external equipment, by reading the image data and transferring it to the predetermined external equipment when an instruction is given for the image data to be saved; and a management component which stores the number of times written according to a predetermined procedure, which updates the stored number of times each time the save control component saves the image data, and which prevents at least one of the photographing by the photographing component and the saving of the image data by the save control component when the number of times has become equal to a predetermined value.

16. The image photographing and ordering method of claim 15, wherein at least, the number of times to be written into the image photographing device is altered in accordance with the rental fee paid by the user.

17. The image photographing and ordering method of claim 15, wherein, when the user has paid an additional fee, the number of times stored in the image photographing device is rewritten according to a predetermined procedure, or information required for the user to personally rewrite the number of times into the image photographing device according to the predetermined procedure is given to the user.

* * * * *